(12) United States Patent
Pant

(10) Patent No.: US 12,367,409 B2
(45) Date of Patent: Jul. 22, 2025

(54) METHOD AND SYSTEM FOR MULTIPLEXING SIGNALS

(71) Applicant: Psiquantum, Corp., Palo Alto, CA (US)

(72) Inventor: Mihir Pant, Mountain View, CA (US)

(73) Assignee: Psiquantum, Corp., Palo Alto, CA (US)

( * ) Notice: Subject to any disclaimer, the term of this patent is extended or adjusted under 35 U.S.C. 154(b) by 916 days.

(21) Appl. No.: 17/530,949

(22) Filed: Nov. 19, 2021

(65) Prior Publication Data

US 2022/0156625 A1    May 19, 2022

Related U.S. Application Data

(60) Provisional application No. 63/116,126, filed on Nov. 19, 2020.

(51) Int. Cl.
| | |
|---|---|
| *G06N 10/40* | (2022.01) |
| *G06E 1/00* | (2006.01) |
| *G06N 10/00* | (2022.01) |
| *H04B 10/70* | (2013.01) |
| *H04J 14/00* | (2006.01) |

(52) U.S. Cl.
CPC .............. *G06N 10/00* (2019.01); *G06E 1/00* (2013.01); *G06N 10/40* (2022.01); *H04B 10/70* (2013.01); *H04J 14/00* (2013.01)

(58) Field of Classification Search
CPC ........ G06N 10/00; G06N 10/40; G06N 10/20; G06N 10/60; G06N 3/08; G06N 3/049; G06N 3/0418; G06N 10/80; H04J 14/0227; H04J 14/00; H04J 14/02; H04L 9/0852; H04L 9/0844; H04L 2209/24;
(Continued)

(56) References Cited

U.S. PATENT DOCUMENTS

| | | |
|---|---|---|
| 8,270,841 B2 | 9/2012 | Nishioka et al. |
| 10,372,014 B1 * | 8/2019 | Vidrighin ............. G02F 1/3536 |

(Continued)

FOREIGN PATENT DOCUMENTS

| | | | |
|---|---|---|---|
| CA | 3112785 A1 | 3/2020 | |
| CA | 2973284 C * | 10/2023 | .......... H04J 14/0227 |

(Continued)

OTHER PUBLICATIONS

Browne, et al., "Resource-Efficient Linear Optics Quantum Computation", Quantum Optics and Laser Science, Blacket Laboratory, Imperial College, Available Online at: https://arxiv.org/pdf/quant-ph/0405157.pdf, Feb. 9, 2005, pp. 1-5.

(Continued)

*Primary Examiner* — Steven P Sax
(74) *Attorney, Agent, or Firm* — Kilpatrick Townsend & Stockton LLP

(57) ABSTRACT

An entangled quantum system can be generated using entanglement-generating circuits that operate non-deterministically. Multiple instances of the entanglement generating circuit can be operated and outputs of successful instances can be propagated. The circuit can be implemented such that a photon that is part of the final output state passes through as few as one or two active switches from generation to the final output state.

19 Claims, 28 Drawing Sheets

(58) Field of Classification Search
CPC ......... H04B 10/70; B82T 10/00; G06F 17/12; G06E 1/00; G06E 1/02; G02B 6/12
See application file for complete search history.

(56) References Cited

U.S. PATENT DOCUMENTS

| | | | |
|---|---|---|---|
| 10,891,555 B2 * | 1/2021 | Ashrafi | H04L 9/085 |
| 11,126,062 B1 * | 9/2021 | Kieling | G02F 1/365 |
| 11,237,454 B2 * | 2/2022 | Carolan | H01S 3/094096 |
| 11,256,029 B2 * | 2/2022 | Kannan | G02B 6/13 |
| 11,460,876 B1 * | 10/2022 | Nickerson | G06E 3/005 |
| 11,475,347 B1 * | 10/2022 | Rudolph | G02B 6/12 |
| 11,501,198 B1 * | 11/2022 | Birchall | G06N 10/40 |
| 11,558,069 B1 * | 1/2023 | Sparrow | G06N 10/40 |
| 2009/0015447 A1 | 1/2009 | Kilbank | |
| 2013/0308956 A1 | 11/2013 | Meyers et al. | |
| 2014/0279822 A1 * | 9/2014 | Bonderson | B82Y 10/00 706/62 |
| 2017/0019185 A1 * | 1/2017 | Agarwal | H04J 1/08 |
| 2018/0157986 A1 | 6/2018 | Oxford et al. | |
| 2019/0138928 A1 | 5/2019 | Monroe et al. | |
| 2019/0196100 A1 | 6/2019 | Nickerson et al. | |
| 2020/0287631 A1 | 9/2020 | Gimeno-Segovia et al. | |
| 2021/0133614 A1 * | 5/2021 | Ashrafi | G02F 3/00 |
| 2021/0351795 A1 * | 11/2021 | Hastings | G06N 10/40 |

FOREIGN PATENT DOCUMENTS

| | | | | |
|---|---|---|---|---|
| CN | 205179072 U | * | 4/2016 | |
| CN | 111327369 A | * | 6/2020 | H04B 10/70 |
| CN | 111510225 A | * | 8/2020 | H04B 10/70 |
| CN | 112068336 A | * | 12/2020 | G02B 27/283 |
| CN | 110288092 B | * | 2/2021 | G06N 10/00 |
| CN | 112305831 A | * | 2/2021 | G06F 1/3501 |
| CN | 114503027 A | * | 5/2022 | G01J 1/0488 |
| EP | 3109803 A1 | | 12/2016 | |
| FR | 3114179 A1 | * | 3/2022 | G06N 10/40 |
| WO | 2017089891 A1 | | 6/2017 | |
| WO | 2019002934 A1 | | 1/2019 | |
| WO | WO-2021055000 A1 | * | 3/2021 | G06N 10/00 |

OTHER PUBLICATIONS

Rosenblum, et al., "A CNOT Gate Between Multiphoton Qubits Encoded in Two Cavities", Department of Applied Physics, Yale University, Available Online at: https://arxiv.org/pdf/1709.05425.pdf, Dec. 20, 2017, pp. 1-10.
U.S. Appl. No. 17/276,094, Non-Final Office Action, Mailed on Sep. 30, 2024, 21 pages.
Baltanas et al., "Entanglement Discrimination in Multi-Rail Electron-Hole Currents", Journal of Physics, Condensed Matter: An Institute of Physics Journal, vol. 27, No. 48, Dec. 9, 2015, 8 pages.
Langford, "Encoding, Manipulating and Measuring Quantum Information in Optics", UQ eSpace, Ph.D. Thesis, School of Physical Sciences, The University of Queensland, 2007, 295 pages.
Nikolopoulos et al., "Quantum State Transfer and Network Engineering", Springer, Quantum Science and Technology, Nov. 7, 2013, 15 pages.
Chen, et al., "Quantifying Entanglement Preservability of Experimental Processes", Physical Review A, vol. 104, Available Online at: https://arxiv.org/abs/2006.05346v1, Sep. 8, 2021, 14 pages.
PCT/US2021/060107, "International Search Report and Written Opinion", Aug. 18, 2022, 9 pages.
Application No. EP21911849.4, Extended European Search Report, Mailed on Nov. 27, 2024, 11 pages.

* cited by examiner

METHOD AND SYSTEM FOR MULTIPLEXING SIGNALS

CROSS-REFERENCE TO RELATED APPLICATIONS

This application claims the benefit of U.S. Provisional Application No. 63/116,126, filed Nov. 19, 2020, the disclosure of which is incorporated herein by reference.

BACKGROUND

Quantum computing can be distinguished from "classical" computing by its reliance on structures referred to as "qubits." At the most general level, a qubit is a quantum system that can exist in one of two orthogonal states (denoted as $|0\rangle$ and $|1\rangle$ in the conventional bra/ket notation) or in a superposition of the two states $$\left(\text{e.g., } \frac{1}{\sqrt{2}}(|0\rangle + |1\rangle)\right).$$

By operating on a system (or ensemble) of qubits, a quantum computer can quickly perform certain categories of computations that would require impractical amounts of time in a classical computer.

One of the main barriers to widespread use of quantum technologies, such as quantum computing, quantum communications, and the like, is the ability to reliably generate entanglement among two or more physical quantum systems, e.g., between two or more qubits. However, various problems that either inhibit the generation of entangled states or destroy the entanglement once created (e.g., such as decoherence) have frustrated advancements in quantum technologies that rely on the use of highly entangled quantum states. Furthermore, in some qubit architectures, e.g., photonic architectures, the generation of entangled states of multiple qubits is an inherently probabilistic process that may have a low probability of success. For example, current methods for producing Bell states from single photons have success probabilities of around 20% (corresponding to an 80% failure rate). Accordingly, there remains a need for improved systems and methods for producing entangled states.

SUMMARY

Some embodiments disclosed herein relate to an optical circuit that can include a plurality of seed state generators, a plurality of entanglement circuits, a first switching network, a second switching network, and classical control logic. Each of the seed state generators can be configured to generate a seed state comprising a quantum system on a plurality of modes that includes a set of inner modes and a set of outer modes. Each of the entanglement circuits can be configured to receive a plurality of input modes and to perform an entanglement-generating operation on the input modes, where the entanglement-generating operation consumes at least one of the input modes and creates an entangled state among other modes with which each consumed input mode was entangled. The first switching network can be coupled to the inner modes of the plurality of seed state generators and configured to selectably couple the inner modes of different ones of the seed state generators to the input modes of different ones of the entanglement circuits. The second switching network can include a plurality of multiplexers, each multiplexer coupled to the outer modes of at least two of the seed state generators and configured to selectably couple the outer modes of one of the seed state generators to a different one of a plurality of output paths. The classical control logic can be coupled to the seed state generators, the entanglement circuits, the first switching network, and the second switching network, and the classical control logic can be configured to: receive heralding signals from the seed state generators and the entanglement circuits; determine, based on the heralding signals from the seed state generators, which inner modes should be selected by the first switching network; and determine, based on the heralding signals from the entanglement circuits and the seed state generators, which outer mode should be selected by each of the second switching networks.

In some embodiments, each of the seed state generators can include a Bell state generator. In some embodiments, each of the seed state generators can include a 3-GHZ state generator. Each 3-GHZ state generator can include two Bell state generators and a type-I fusion circuit coupled to one output mode of each of the Bell state generators.

In some embodiments, each entanglement circuit can include a type II fusion circuit and/or a type I fusion circuit.

In some embodiments, the seed state corresponds to a plurality of entangled qubits.

In some embodiments, each multiplexer in the second switching network can be further configured to selectably couple each selected outer mode to a selected one of a plurality of alternative output paths, and the classical control logic can be further configured to determine which alternative output path should be selected by each multiplexer.

In some embodiments, the entanglement circuit comprises a plurality of successive entanglement operation stages (each of which can be implemented using optical components), and each entanglement operation stage can be coupled to a next successive entanglement operation stage by an additional switching network. The classical control logic can be configured to control operations of the additional switching network(s) based on classical heralding signals from previous operation stages.

In some embodiments, a plurality of photon sources can be coupled to each of the seed state generators and configured to provide input photons to the seed state generators.

In some embodiments, the first switching network can include a plurality of multiplexing circuits, each multiplexing circuit coupled to the inner modes of a different subset of the seed state generators and to the input modes of a different one of the entanglement circuits.

Some embodiments disclosed herein relate to methods of generating entangled quantum systems. In some embodiments, a method can include: operating a plurality of seed state generators to produce a plurality of seed states, each seed state including a quantum system propagating on a plurality of modes that includes a set of inner modes and a set of outer modes; receiving, by a classical control logic unit, heralding signals from the plurality of seed state generators; determining, by the classical control logic unit, based on the heralding signals from the seed state generators, which of the seed state generators succeeded; operating a first switching network, wherein the first switching network selectably couples the inner modes of different ones of the seed state generators to input modes of different ones of a plurality of entanglement circuits and wherein operation of the first switching network is responsive to determining which of the seed state generators succeeded; operating the plurality of entanglement circuits, wherein each entanglement circuit performs an entanglement-generating operation on the input modes, wherein the entanglement-generating operation consumes at least one of the input modes and creates an entangled state among other modes with which each consumed input mode was entangled; receiving, by the classical control logic unit, heralding signals from the plurality of entanglement circuits; determining, by the classical control logic unit, based on the heralding signals from the plurality of entanglement circuits, which of the entanglement circuits succeeded; and operating a second switching network including a plurality of active multiplexers, wherein each active multiplexer selectably couples one of the outer modes of one of the seed state generators to an output path and wherein operation of the plurality of second switching networks is responsive to determining which of the entanglement circuits succeeded and determining which of the seed state generators succeeded.

In some embodiments, each of the seed states can be a Bell state. In some embodiments, each of the seed states can be a 3-GHZ state.

In some embodiments, the entanglement operation can include a type I fusion operation and/or a type II fusion operation.

In some embodiments, each entanglement circuit can performs a sequence of entanglement-generating operations on different ones of the input modes, and the method can further include: selecting, by the classical control logic unit, particular input modes to be used in a next entanglement-generating operation in the sequence, wherein the selection is based at least in part on determining which instances of an earlier entanglement-generating operation in the sequence.

In some embodiments, each active multiplexer can have a plurality of alternative output paths, and the method can further include selecting, by the classical control logic unit, one of the plurality of alternative output paths for each active multiplexer. In some embodiments, selecting one of the plurality of alternative output paths for each active multiplexer can be based at least in part on a quantum computation to be performed.

In some embodiments, the method can further include: generating a plurality of photons using a plurality of instances of a photon source; and providing a subset of the plurality of photons to each of the seed state generators.

Some embodiments disclosed herein relate to an optical circuit that can include: a plurality of seed state generators, a plurality of fusion circuits, a plurality of first switching networks, a plurality of second switching networks, and control logic. Each seed state generator can be configured to generate a seed state that includes an inner qubit propagating on a set of inner modes and an outer qubit propagating on a set of outer modes. Each fusion circuit can be configured to operate on a pair of input modes in a fusion operation that consumes at least one inner mode from the seed states and creates an entangled state among the remaining modes from the seed states. Each switching network in the plurality of first switching networks can be coupled to the inner modes of at least two of the seed state generators and configured to selectably couple the inner modes of one of the seed state generators to one of the input modes of one of the fusion circuits. Each switching network in the plurality of second switching networks can be coupled to the outer modes of at least two of the seed state generators and configured to selectably couple the outer modes of one of the seed state generators to an output path. The classical control logic can be configured to: receive heralding signals from the seed state generators and the fusion circuits; determine, based on the heralding signals from the seed state generators, which inner mode should be selected by each of the first switching networks; and determine, based on the heralding signals from the fusion circuits and the seed state generators, which outer mode should be selected by each of the second switching networks.

Some embodiments disclosed herein relate to methods of generating entangled quantum systems. In some embodiments, a method can include: operating a plurality of seed state generators to produce a plurality of seed states, each seed state including an inner qubit propagating on a set of inner modes and an outer qubit propagating on a set of outer modes; receiving, by a classical control logic unit, heralding signals from the plurality of seed state generators; determining, based on the heralding signals from the seed state generators, which of the seed state generators succeeded; operating a plurality of first switching networks, wherein each of the first switching networks selectably couples the inner modes of a pair of successful seed state generators to a different input mode of one of a plurality of fusion circuits and wherein operation of the plurality of first switching networks is responsive to determining which of the seed state generators succeeded; operating the plurality of fusion circuits, wherein each fusion circuit operates operate on the input modes thereof in a fusion operation that consumes at least one qubit from the inner modes and creates an entangled state among the remaining qubits from the input seed states; receiving, by the classical control logic unit, heralding signals from the plurality of fusion circuits; determining, based on the heralding signals from the plurality of fusion circuits, which of the fusion circuits succeeded; and operating a plurality of second switching networks, wherein each of the second switching networks selectably couples the outer modes of one of the seed state generators to an output path and wherein operation of the plurality of second switching networks is responsive to determining which of the fusion circuits succeeded and determining which of the seed state generators succeeded.

The following detailed description, together with the accompanying drawings, will provide a better understanding of the nature and advantages of the claimed invention.

DETAILED DESCRIPTION

Figure 1:
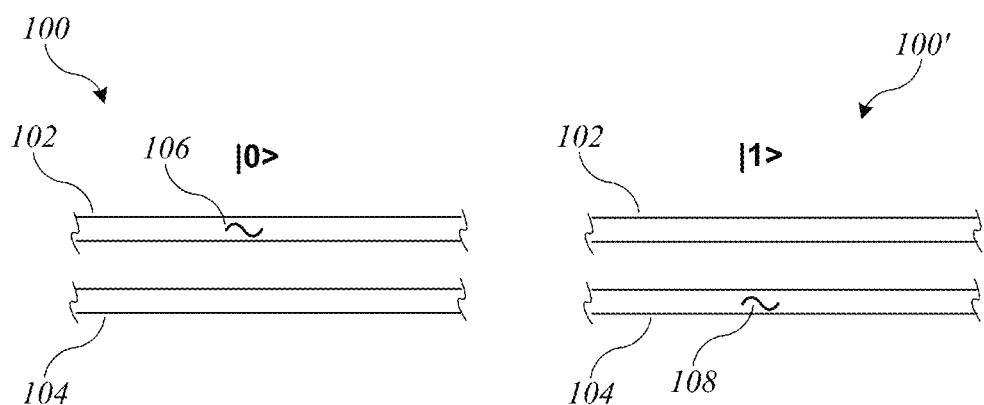
FIG. 1 shows two representations of a portion of a pair of waveguides corresponding to a dual-rail-encoded photonic qubit.

Disclosed herein are examples (also referred to as "embodiments") of systems and methods for creating and operating on entangled quantum systems based on various physical quantum systems, including photonic systems. Such embodiments can be used, for example, in quantum computing as well as in other contexts (e.g., quantum communication) that exploit quantum entanglement. In some embodiments, the entangled quantum system can be a system of qudits or qubits. As used herein, a qudit can be any quantum system having a quantum state space that can be modeled as a (complex) d-dimensional vector space (for any integer d), which can be used to encode n bits of information. In the case where d=2, a qudit can be referred to as a "qubit."

To facilitate understanding of the disclosure, an overview of relevant concepts and terminology is provided in Section 1. With this context established, Section 2 describes examples of circuits and methods for generating and operating on entangled quantum systems. Such circuits and methods can be implemented, for example, using linear optical components. Although embodiments are described with specific detail to facilitate understanding, those skilled in the art with access to this disclosure will appreciate that the claimed invention can be practiced without these details.

1. Overview of Quantum Computing

Quantum computing relies on the dynamics of quantum objects, e.g., photons, electrons, atoms, ions, molecules, nanostructures, and the like, which follow the rules of quantum theory. In quantum theory, the quantum state of a quantum object is described by a set of physical properties, the complete set of which is referred to as a mode. In some embodiments, a mode is defined by specifying the value (or distribution of values) of one or more properties of the quantum object. For example, in the case where the quantum object is a photon, modes can be defined by the frequency of the photon, the position in space of the photon (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields), a time window in which the photon is propagating, the orbital angular momentum state of the photon, and the like.

For the case of photons propagating in a waveguide, it is convenient to express the state of the photon as one of a set of discrete spatio-temporal modes. For example, the spatial mode $k_i$ of the photon is determined according to which one of a finite set of discrete waveguides the photon is propagating in, and the temporal mode $t_j$ is determined by which one of a set of discrete time periods (referred to herein as "bins") the photon is present in. In some photonic implementations, the degree of temporal discretization can be provided by a pulsed laser which is responsible for generating the photons. In examples below, spatial modes will be used primarily to avoid complication of the description. However, one of ordinary skill will appreciate that the systems and methods can apply to any type of mode, e.g., temporal modes, polarization modes, and any other mode or set of modes that serves to specify the quantum state. Further, in the description that follows, embodiments will be described that employ photonic waveguides to define the spatial modes of the photon. However, persons of ordinary skill in the art with access to this disclosure will appreciate that other types of mode, e.g., temporal modes, energy states, and the like, can be used without departing from the scope of the present disclosure. In addition, persons of ordinary skill in the art will be able to implement examples using other types of quantum systems, including but not limited to other types of photonic systems.

For quantum systems of multiple indistinguishable particles, rather than describing the quantum state of each particle in the system, it is useful to describe the quantum state of the entire many-body system using the formalism of Fock states (sometimes referred to as the occupation number representation). In the Fock state description, the many-body quantum state is specified by how many particles there are in each mode of the system. For example, a multimode, two particle Fock state $|1001\rangle_{1,2,3,4}$ specifies a two-particle quantum state with one particle in mode 1, zero particles in mode 2, zero particles in mode 3, and one particle in mode 4. Again, as introduced above, a mode can be any property of the quantum object. For the case of a photon, any two modes of the electromagnetic field can be used, e.g., one may design the system to use modes that are related to a degree of freedom that can be manipulated passively with linear optics. For example, polarization, spatial degree of freedom, or angular momentum could be used. The four-mode system represented by the two particle Fock state $|1001\rangle_{1,2,3,4}$ can be physically implemented as four distinct waveguides with two of the four waveguides having one photon travelling within them. Other examples of a state of such a many-body quantum system include the four-particle Fock state $|1111\rangle_{1,2,3,4}$ that represents each mode occupied by one particle and the four-particle Fock state $|2200\rangle_{1,2,3,4}$ that represents modes 1 and 2 respectively occupied by two particles and modes 3 and 4 occupied by zero particles. For modes having zero particles present, the term "vacuum mode" is used. For example, for the four-particle Fock state $|2200\rangle_{1,2,3,4}$ modes 3 and 4 are referred to herein as "vacuum modes." Fock states having a single occupied mode can be represented in shorthand using a subscript to identify the occupied mode. For example, $|0010\rangle_{1,2,3,4}$ is equivalent to $|1_3\rangle$.

1.1. Qubits

As used herein, a "qubit" (or quantum bit) is a quantum system with an associated quantum state that can be used to encode information. A quantum state can be used to encode one bit of information if the quantum state space can be modeled as a (complex) two-dimensional vector space, with one dimension in the vector space being mapped to logical value 0 and the other to logical value 1. In contrast to classical bits, a qubit can have a state that is a superposition of logical values 0 and 1. More generally, a "qudit" can be any quantum system having a quantum state space that can be modeled as a (complex) n-dimensional vector space (for any integer n), which can be used to encode n bits of information. For the sake of clarity of description, the term "qubit" is used in this section, although in some embodiments the system can also employ quantum information carriers that encode information in a manner that is not necessarily associated with a binary bit, such as a qudit. Qubits (or qudits) can be implemented in a variety of quantum systems. Examples of qubits include: polarization states of photons; presence of photons in waveguides; or energy states of molecules, atoms, ions, nuclei, or photons. Other examples include other engineered quantum systems such as flux qubits, phase qubits, or charge qubits (e.g., formed from a superconducting Josephson junction); topological qubits (e.g., Majorana fermions); or spin qubits formed from vacancy centers (e.g., nitrogen vacancies in diamond).

A qubit can be "dual-rail encoded" such that the logical value of the qubit is encoded by occupation of one of two modes of the quantum system. For example, the logical 0 and 1 values can be encoded as follows:

$$|0\rangle_L = |10\rangle_{1,2} \tag{1}$$

$$|1\rangle_L = |01\rangle_{1,2} \tag{2}$$

where the subscript "L" indicates that the ket represents a logical state (e.g., a qubit value) and, as before, the notation $|ij\rangle_{1,2}$ on the right-hand side of the equations above indicates that there are i particles in a first mode and j particles in a second mode, respectively (e.g., where i and j are integers). In this notation, a two-qubit system having a logical state $|0\rangle|1\rangle_L$, (representing a state of two qubits, the first qubit being in a '0' logical state and the second qubit being in a '1' logical state) may be represented using occupancy across four modes by $|1001\rangle_{1,2,3,4}$ (e.g., in a photonic system, one photon in a first waveguide, zero photons in a second waveguide, zero photons in a third waveguide, and one photon in a fourth waveguide). In some instances throughout this disclosure, the various subscripts are omitted to avoid unnecessary mathematical clutter.

1.1. Entangled States

Many of the advantages of quantum computing relative to "classical" computing (e.g., conventional digital computers using binary logic) stem from the ability to create entangled states of multi-qubit systems. In mathematical terms, a state $|\psi\rangle$ of n quantum objects is a separable state if $|\psi\rangle = |\psi_1\rangle \otimes \ldots \otimes |\psi_n\rangle$, and an entangled state is a state that is not separable. One example is a Bell state, which, loosely speaking, is a type of maximally entangled state for a two-qubit system, and qubits in a Bell state may be referred to as a Bell pair. For example, for qubits encoded by single photons in pairs of modes (a dual-rail encoding), examples of Bell states include:

$$|\Phi^+\rangle = \frac{|0\rangle_L|0\rangle_L + |1\rangle_L|1\rangle_L}{\sqrt{2}} = \frac{|10\rangle|10\rangle + |01\rangle|01\rangle}{\sqrt{2}} \tag{3}$$

$$|\Phi^-\rangle = \frac{|0\rangle_L|0\rangle_L - |1\rangle_L|1\rangle_L}{\sqrt{2}} = \frac{|10\rangle|10\rangle - |01\rangle|01\rangle}{\sqrt{2}} \tag{4}$$

$$|\Psi^+\rangle = \frac{|0\rangle_L|1\rangle_L + |1\rangle_L|0\rangle_L}{\sqrt{2}} = \frac{|10\rangle|01\rangle + |01\rangle|10\rangle}{\sqrt{2}} \tag{5}$$

$$|\Psi^-\rangle = \frac{|0\rangle_L|1\rangle_L - |1\rangle_L|0\rangle_L}{\sqrt{2}} = \frac{|10\rangle|01\rangle - |01\rangle|10\rangle}{\sqrt{2}} \tag{6}$$

More generally, an n-qubit Greenberger-Horne-Zeilinger (GHZ) state (or "n-GHZ state") is an entangled quantum state of n qubits. For a given orthonormal logical basis, an n-GHZ state is a quantum superposition of all qubits being in a first basis state superposed with all qubits being in a second basis state:

$$|GHZ\rangle = \frac{|0\rangle^{\otimes M} + |1\rangle^{\otimes M}}{\sqrt{2}} \tag{7}$$

where the kets above refer to the logical basis. For example, for qubits encoded by single photons in pairs of modes (a dual-rail encoding), a 3-GHZ state can be written:

$$|GHZ\rangle = \tag{8}$$

$$\frac{|0\rangle_L|0\rangle_L|0\rangle_L - |1\rangle_L|1\rangle_L|1\rangle_L}{\sqrt{2}} = \frac{|10\rangle|10\rangle|10\rangle + |01\rangle|01\rangle|01\rangle}{\sqrt{2}}$$

where the kets above refer to photon occupation number in six respective modes (with mode subscripts omitted).

1.2. Physical Implementations

Qubits (and operations on qubits) can be implemented using a variety of physical systems. In some examples described herein, qubits are provided in an integrated photonic system employing waveguides, beam splitters, photonic switches, and single photon detectors, and the modes that can be occupied by photons are spatiotemporal modes that correspond to presence of a photon in a waveguide. Modes can be coupled using mode couplers, e.g., optical beam splitters, to implement transformation operations, and measurement operations can be implemented by coupling single-photon detectors to specific waveguides. One of ordinary skill in the art with access to this disclosure will appreciate that modes defined by any appropriate set of degrees of freedom, e.g., polarization modes, temporal modes, and the like, can be used without departing from the scope of the present disclosure. For instance, for modes that only differ in polarization (e.g., horizontal (H) and vertical (V)), a mode coupler can be any optical element that coherently rotates polarization, e.g., a birefringent material such as a waveplate. For other systems such as ion trap systems or neutral atom systems, a mode coupler can be any physical mechanism that can couple two modes, e.g., a pulsed electromagnetic field that is tuned to couple two internal states of the atom/ion.

In some embodiments of a photonic quantum computing system using dual-rail encoding, a qubit can be implemented using a pair of waveguides. FIG. 1 shows two representations (100, 100') of a portion of a pair of waveguides 102, 104 that can be used to provide a dual-rail-encoded photonic qubit. At 100, a photon 106 is in waveguide 102 and no photon is in waveguide 104 (also referred to as a vacuum mode); in some embodiments, this corresponds to the $|0\rangle_L$ state of a photonic qubit. At 100', a photon 108 is in waveguide 104, and no photon is in waveguide 102; in some embodiments this corresponds to the $|1\rangle_L$ state of the photonic qubit. To prepare a photonic qubit in a known logical state, a photon source (not shown) can be coupled to one end of one of the waveguides. The photon source can be operated to emit a single photon into the waveguide to which it is coupled, thereby preparing a photonic qubit in a known state. Photons travel through the waveguides, and by periodically operating the photon source, a quantum system having qubits whose logical states map to different temporal modes of the photonic system can be created in the same pair of waveguides. In addition, by providing multiple pairs of waveguides, a quantum system having qubits whose logical states correspond to different spatiotemporal modes can be created. It should be understood that the waveguides in such a system need not have any particular spatial relationship to each other. For instance, they can be but need not be arranged in parallel.

Occupied modes can be created by using a photon source to generate a photon that then propagates in the desired waveguide. A photon source can be, for instance, a resonator-based source that emits photon pairs, also referred to as a heralded single photon source. In one example of such a source, the source is driven by a pump, e.g., a light pulse, that is coupled into a system of optical resonators that, through a nonlinear optical process (e.g., spontaneous four wave mixing (SFWM), spontaneous parametric down-conversion (SPDC), second harmonic generation, or the like), can generate a pair of photons. Many different types of photon sources can be employed. Examples of photon pair sources can include a microring-based spontaneous four wave mixing (SPFW) heralded photon source (HPS). However, the precise type of photon source used is not critical and any type of nonlinear source, employing any process, such as SPFW, SPDC, or any other process can be used. Other classes of sources that do not necessarily require a nonlinear material can also be employed, such as those that employ atomic and/or artificial atomic systems, e.g., quantum dot sources, color centers in crystals, and the like. In some cases, sources may or may not be coupled to photonic cavities, e.g., as can be the case for artificial atomic systems such as quantum dots coupled to cavities. Other types of photon sources also exist for SPWM and SPDC, such as optomechanical systems and the like.

In such cases, operation of the photon source may be non-deterministic (also sometimes referred to as "stochastic") such that a given pump pulse may or may not produce a photon pair. In some embodiments, coherent spatial and/or temporal multiplexing of several non-deterministic sources (referred to herein as "active" multiplexing) can be used to allow the probability of having one mode become occupied during a given cycle to approach 1. One of ordinary skill will appreciate that many different active multiplexing architectures that incorporate spatial and/or temporal multiplexing are possible. For instance, active multiplexing schemes that employ log-tree, generalized Mach-Zehnder interferometers, multimode interferometers, chained sources, chained sources with dump-the-pump schemes, asymmetric multi-crystal single photon sources, or any other type of active multiplexing architecture can be used. In some embodiments, the photon source can employ an active multiplexing scheme with quantum feedback control and the like.

Measurement operations can be implemented by coupling a waveguide to a single-photon detector that generates a classical signal (e.g., a digital logic signal) indicating that a photon has been detected by the detector. Any type of photodetector that has sensitivity to single photons can be used. In some embodiments, detection of a photon (e.g., at the output end of a waveguide) indicates an occupied mode while absence of a detected photon can indicate an unoccupied mode.

Some embodiments described below relate to physical implementations of unitary transform operations that couple modes of a quantum system, which can be understood as transforming the quantum state of the system. For instance, if the initial state of the quantum system (prior to mode coupling) is one in which one mode is occupied with probability 1 and another mode is unoccupied with probability 1 (e.g., a state $|10\rangle$ in the Fock notation introduced above), mode coupling can result in a state in which both modes have a nonzero probability of being occupied, e.g., a state $a_1|10\rangle + a_2|01\rangle$, where $|a_1|^2 + |a_2|^2 = 1$. In some embodiments, operations of this kind can be implemented by using beam splitters to couple modes together and variable phase shifters to apply phase shifts to one or more modes. The amplitudes $a_1$ and $a_2$ depend on the reflectivity (or transmissivity) of the beam splitters and on any phase shifts that are introduced.

Figure 2A:
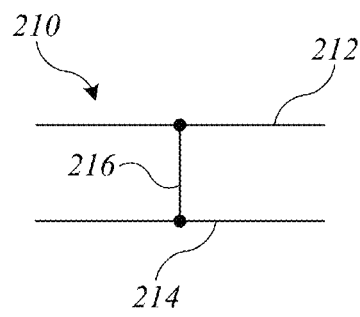
FIG. 2A shows a schematic diagram for coupling of two modes.

FIG. 2A shows a schematic diagram 210 (also referred to as a circuit diagram or circuit notation) for coupling of two modes. The modes are drawn as horizontal lines 212, 214, and the mode coupler 216 is indicated by a vertical line that is terminated with nodes (solid dots) to identify the modes being coupled. In the more specific language of linear quantum optics, the mode coupler 216 shown in FIG. 2A represents a 50/50 beam splitter that implements a transfer matrix:

$$T = \frac{1}{\sqrt{2}}\begin{pmatrix} 1 & i \\ i & 1 \end{pmatrix}, \tag{9}$$

where T defines the linear map for the photon creation operators on two modes. (In certain contexts, transfer matrix T can be understood as implementing a first-order imaginary Hadamard transform.) By convention the first column of the transfer matrix corresponds to creation operators on the top mode (referred to herein as mode 1, labeled as horizontal line 212), and the second column corresponds to creation operators on the second mode (referred to herein as mode 2, labeled as horizontal line 214), and so on if the system includes more than two modes. More explicitly, the mapping can be written as:

$$\begin{pmatrix} a_1^\dagger \\ a_2^\dagger \end{pmatrix}_{input} \mapsto \frac{1}{\sqrt{2}} \begin{pmatrix} 1 & -i \\ -i & 1 \end{pmatrix} \begin{pmatrix} a_1^\dagger \\ a_2^\dagger \end{pmatrix}_{output}, \quad (10)$$

where subscripts on the creation operators indicate the mode that is operated on, the subscripts input and output identify the form of the creation operators before and after the beam splitter, respectively and where:

$$a_i |n_i, n_j\rangle = \sqrt{n_i} |n_i-1, n_j\rangle$$

$$a_j |n_i, n_j\rangle = \sqrt{n_j} |n_i, n_j-1\rangle$$

$$a_j^\dagger |n_i, n_j\rangle = \sqrt{n_j+1} |n_i, n_j+1\rangle \quad (11)$$

For example, the application of the mode coupler shown in FIG. 2A leads to the following mappings:

$$a_{1_{input}}^\dagger \mapsto \frac{1}{\sqrt{2}} \left( a_{1_{output}}^\dagger - i a_{2_{output}}^\dagger \right) \quad (12)$$

$$a_{2_{input}}^\dagger \mapsto \frac{1}{\sqrt{2}} \left( -i a_{1_{output}}^\dagger + a_{2_{output}}^\dagger \right)$$

Thus, the action of the mode coupler described by Eq. (9) is to take the input states $|10\rangle$, $|01\rangle$, and $|11\rangle$ to $$|10\rangle \mapsto \frac{|10\rangle - i|01\rangle}{\sqrt{2}} \quad (13)$$

$$|01\rangle \mapsto \frac{-i|10\rangle + |01\rangle}{\sqrt{2}}$$

$$|11\rangle \mapsto \frac{-i}{2}(|20\rangle + |02\rangle)$$

Figure 2B:
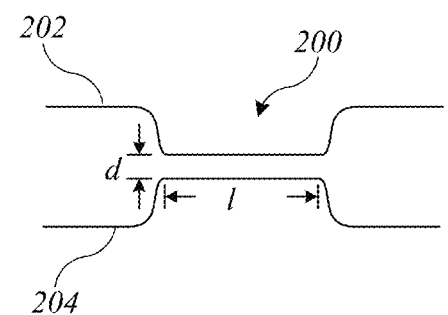
FIG. 2B shows, in schematic form, a physical implementation of mode coupling in a photonic system that can be used in some embodiments.

FIG. 2B shows a physical implementation of a mode coupling that implements the transfer matrix T of Eq. (9) for two photonic modes in accordance with some embodiments. In this example, the mode coupling is implemented using a waveguide beam splitter 200, also sometimes referred to as a directional coupler or mode coupler. Waveguide beam splitter 200 can be realized by bringing two waveguides 202, 204 into close enough proximity that the evanescent field of one waveguide can couple into the other. By adjusting the separation d between waveguides 202, 204 and/or the length l of the coupling region, different couplings between modes can be obtained. In this manner, a waveguide beam splitter 200 can be configured to have a desired transmissivity. For example, the beam splitter can be engineered to have a transmissivity equal to 0.5 (i.e., a 50/50 beam splitter for implementing the specific form of the transfer matrix T introduced above). If other transfer matrices are desired, the reflectivity (or the transmissivity) can be engineered to be greater than 0.6, greater than 0.7, greater than 0.8, or greater than 0.9 without departing from the scope of the present disclosure.

In addition to mode coupling, some unitary transforms may involve phase shifts applied to one or more modes. In some photonic implementations, variable phase-shifters can be implemented in integrated circuits, providing control over the relative phases of the state of a photon spread over multiple modes. Examples of transfer matrices that define such a phase shifts are given by (for applying a +i and −i phase shift to the second mode, respectively):

$$s = \begin{pmatrix} 1 & 0 \\ 0 & i \end{pmatrix} \quad (14)$$

$$s^\dagger = \begin{pmatrix} 1 & 0 \\ 0 & -i \end{pmatrix}$$

For silica-on-silicon materials some embodiments implement variable phase-shifters using thermo-optical switches. The thermo-optical switches use resistive elements fabricated on the surface of the chip, that via the thermo-optical effect can provide a change of the refractive index n by raising the temperature of the waveguide by an amount of the order of $10^{-5}$ K. One of skill in the art with access to the present disclosure will understand that any effect that changes the refractive index of a portion of the waveguide can be used to generate a variable, electrically tunable, phase shift. For example, some embodiments use beam splitters based on any material that supports an electro-optic effect, so-called $\chi^2$ and $\chi^3$ materials such as lithium niobite, BBO, KTP, and the like and even doped semiconductors such as silicon, germanium, and the like.

Figure 3A:
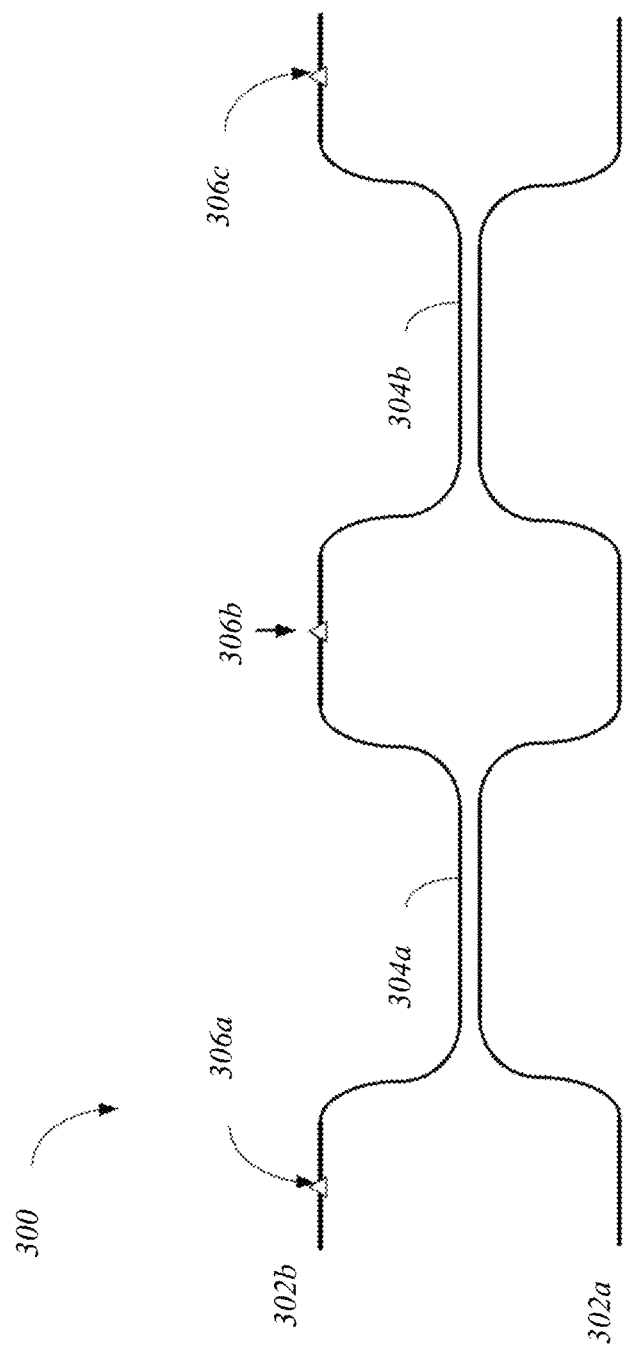
FIGS. 3A and 3B show, in schematic form, examples of physical implementations of a Mach-Zehnder Interferometer (MZI) configuration that can be used in some embodiments.
Figure 3B:
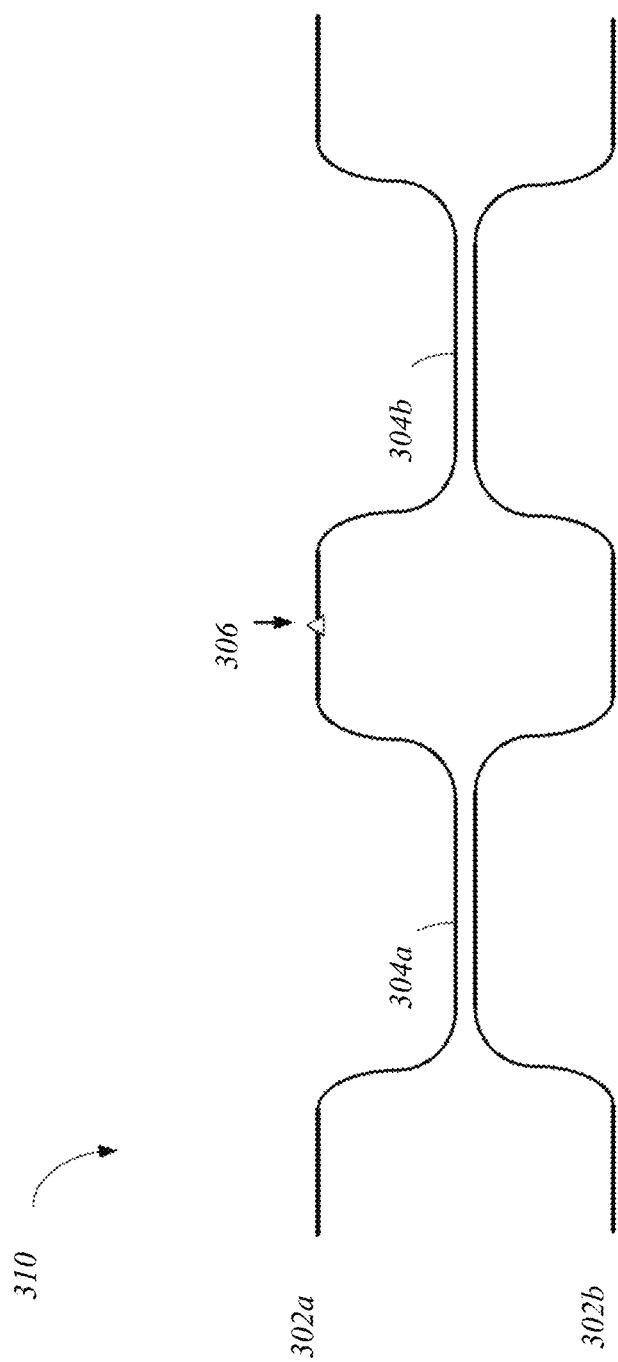

Beam-splitters with variable transmissivity and arbitrary phase relationships between output modes can also be achieved by combining directional couplers and variable phase-shifters in a Mach-Zehnder Interferometer (MZI) configuration 300, e.g., as shown in FIG. 3A. Complete control over the relative phase and amplitude of the two modes 302a, 302b in dual rail encoding can be achieved by varying the phases imparted by phase shifters 306a, 306b, and 306c and the length and proximity of coupling regions 304a and 304b. FIG. 3B shows a slightly simpler example of a MZI 310 that allows for a variable transmissivity between modes 302a, 302b by varying the phase imparted by the phase shifter 306. FIGS. 3A and 3B are examples of how one could implement a mode coupler in a physical device, but any type of mode coupler/beam splitter can be used without departing from the scope of the present disclosure.

Figure 4A:
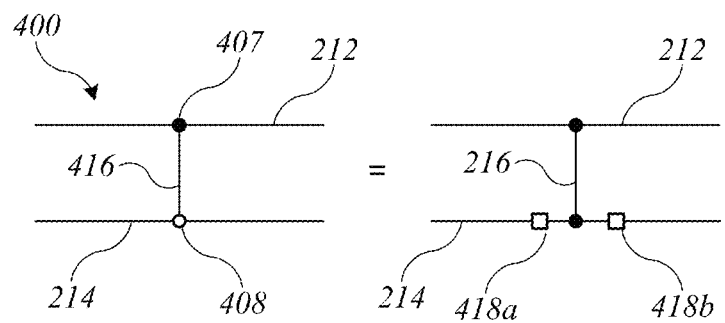
FIG. 4A shows another schematic diagram for coupling of two modes.

In some embodiments, beam splitters and phase shifters can be employed in combination to implement a variety of transfer matrices. For example, FIG. 4A shows, in a schematic form similar to that of FIG. 2A, a mode coupler 400 implementing the following transfer matrix:

$$T_r = \frac{1}{\sqrt{2}} \begin{pmatrix} 1 & 1 \\ 1 & -1 \end{pmatrix}. \quad (15)$$

Thus, mode coupler 400 applies the following mappings:

$$|10\rangle \mapsto \frac{|10\rangle + |01\rangle}{\sqrt{2}} \quad (16)$$

-continued $$|01\rangle \mapsto \frac{|10\rangle - |01\rangle}{\sqrt{2}}$$

$$|11\rangle \mapsto \frac{1}{2}(|20\rangle + |02\rangle).$$

Figure 4B:
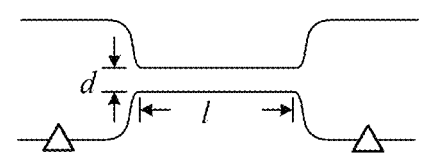
FIG. 4B shows, in schematic form, a physical implementation of the mode coupling of FIG. 4A in a photonic system that can be used in some embodiments.

The transfer matrix $T_r$ of Eq. (15) is related to the transfer matrix T of Eq. (9) by a phase shift on the second mode. This is schematically illustrated in FIG. 4A by the closed node 407 where mode coupler 416 couples to the first mode (line 212) and open node 408 where mode coupler 416 couples to the second mode (line 214). More specifically, $T_r$=sTs, and, as shown at the right-hand side of FIG. 4A, mode coupler 416 can be implemented using mode coupler 216 (as described above), with a preceding and following phase shift (denoted by open squares 418a, 418b). Thus, the transfer matrix $T_r$ can be implemented by the physical beam splitter shown in FIG. 4B, where the open triangles represent +i phase shifters.

Figure 5:
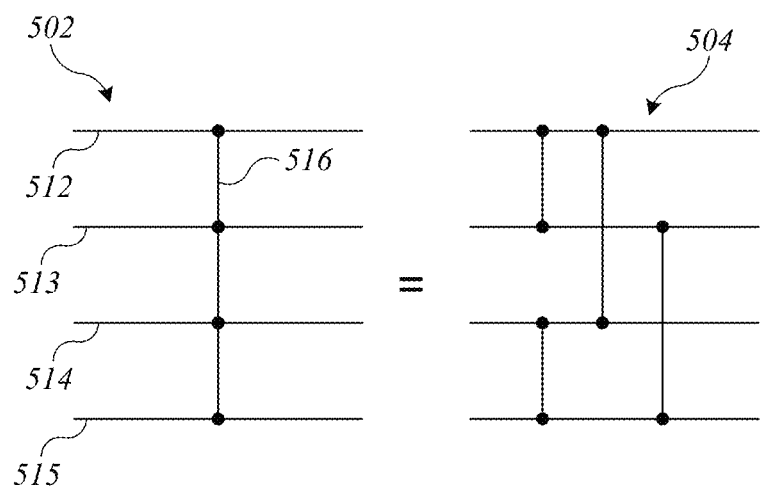
FIG. 5 shows a four-mode coupling scheme that implements a "spreader," or "mode-information erasure," transformation on four modes in accordance with some embodiments.

Similarly, networks of mode couplers and phase shifters can be used to implement couplings among more than two modes. For example, FIG. 5 shows a four-mode coupling scheme that implements a "spreader," or "mode-information erasure," transformation on four modes, i.e., it takes a photon in any one of the input modes and delocalizes the photon amongst each of the four output modes such that the photon has equal probability of being detected in any one of the four output modes. (The well-known Hadamard transformation is one example of a spreader transformation.) As in FIG. 2A, the horizontal lines 512-515 correspond to modes, and the mode coupling is indicated by a vertical line 516 with nodes (dots) to identify the modes being coupled. In this case, four modes are coupled. Circuit notation 502 is an equivalent representation to circuit diagram 504, which is a network of first-order mode couplings. More generally, where a higher-order mode coupling can be implemented as a network of first-order mode couplings, a circuit notation similar to notation 502 (with an appropriate number of modes) may be used.

Figure 6:
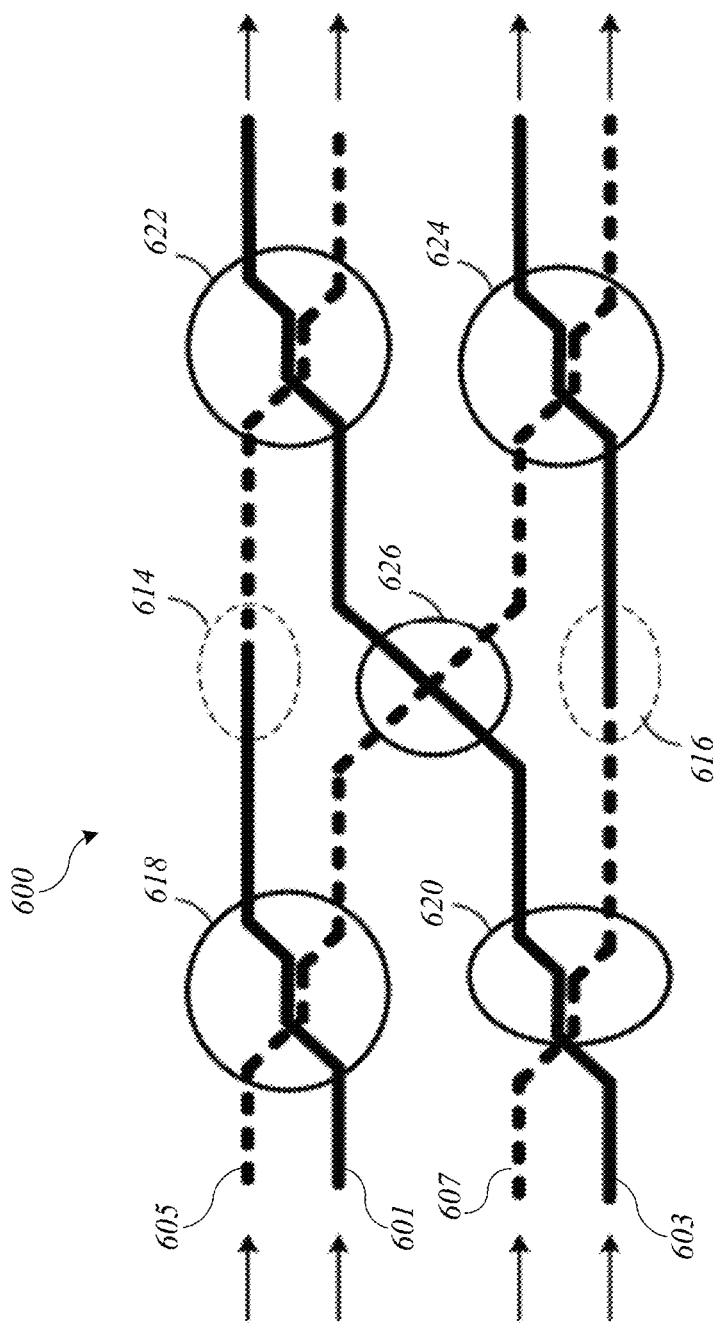
FIG. 6 illustrates an example optical device that can implement the four-mode mode-spreading transform shown schematically in FIG. 5 in accordance with some embodiments.

FIG. 6 illustrates an example optical device 600 that can implement the four-mode mode-spreading transform shown schematically in FIG. 5 in accordance with some embodiments. Optical device 600 includes a first set of optical waveguides 601, 603 formed in a first layer of material (represented by solid lines in FIG. 6) and a second set of optical waveguides 605, 607 formed in a second layer of material that is distinct and separate from the first layer of material (represented by dashed lines in FIG. 6). The second layer of material and the first layer of material are located at different heights on a substrate. One of ordinary skill will appreciate that an interferometer such as that shown in FIG. 6 could be implemented in a single layer if appropriate low loss waveguide crossing were employed.

At least one optical waveguide 601, 603 of the first set of optical waveguides is coupled with an optical waveguide 605, 607 of the second set of optical waveguides with any type of suitable optical coupler, e.g., the directional couplers described herein (e.g., the optical couplers shown in FIGS. 2B, 3A, 3B). For example, the optical device shown in FIG. 6 includes four optical couplers 618, 620, 622, and 624. Each optical coupler can have a coupling region in which two waveguides propagate in parallel. Although the two waveguides are illustrated in FIG. 6 as being offset from each other in the coupling region, the two waveguides may be positioned directly above and below each other in the coupling region without offset. In some embodiments, one or more of the optical couplers 618, 620, 622, and 624 are configured to have a coupling efficiency of approximately 50% between the two waveguides (e.g., a coupling efficiency between 49% and 51%, a coupling efficiency between 49.9% and 50.1%, a coupling efficiency between 49.99% and 50.01%, and a coupling efficiency of 50%, etc.). For example, the length of the two waveguides, the refractive indices of the two waveguides, the widths and heights of the two waveguides, the refractive index of the material located between two waveguides, and the distance between the two waveguides are selected to provide the coupling efficiency of 50% between the two waveguides. This allows the optical coupler to operate like a 50/50 beam splitter.

In addition, the optical device shown in FIG. 6 can include two inter-layer optical couplers 614 and 616. Optical coupler 614 allows transfer of light propagating in a waveguide on the first layer of material to a waveguide on the second layer of material, and optical coupler 616 allows transfer of light propagating in a waveguide on the second layer of material to a waveguide on the first layer of material. The optical couplers 614 and 616 allow optical waveguides located in at least two different layers to be used in a multi-channel optical coupler, which, in turn, enables a compact multi-channel optical coupler.

Furthermore, the optical device shown in FIG. 6 includes a non-coupling waveguide crossing region 626. In some implementations, the two waveguides (603 and 605 in this example) cross each other without having a parallel coupling region present at the crossing in the non-coupling waveguide crossing region 626 (e.g., the waveguides can be two straight waveguides that cross each other at a nearly 90-degree angle).

Those skilled in the art will understand that the foregoing examples are illustrative and that photonic circuits using beam splitters and/or phase shifters can be used to implement many different transfer matrices, including transfer matrices for real and imaginary Hadamard transforms of any order, discrete Fourier transforms, and the like. One class of photonic circuits, referred to herein as "spreader" or "mode-information erasure (MIE)" circuits, has the property that if the input is a single photon localized in one input mode, the circuit delocalizes the photon amongst each of a number of output modes such that the photon has equal probability of being detected in any one of the output modes. Examples of spreader or MIE circuits include circuits implementing Hadamard transfer matrices. (It is to be understood that spreader or MIE circuits may receive an input that is not a single photon localized in one input mode, and the behavior of the circuit in such cases depends on the particular transfer matrix implemented.) In other instances, photonic circuits can implement other transfer matrices, including transfer matrices that, for a single photon in one input mode, provide unequal probability of detecting the photon in different output modes.

Figure 7:
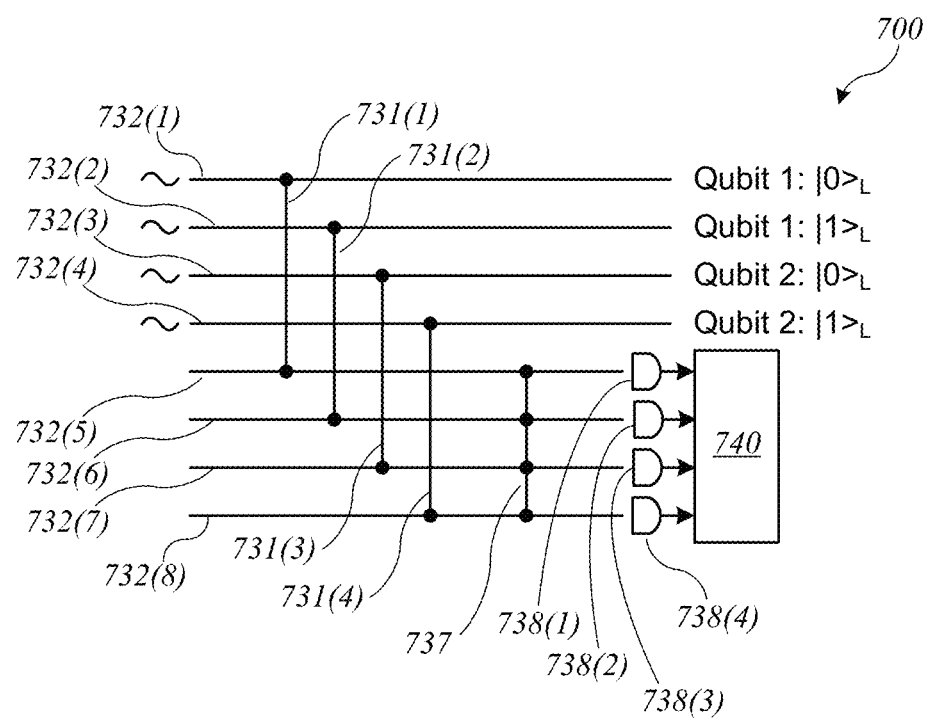
FIG. 7 shows a circuit diagram for a dual-rail-encoded Bell state generator that can be used in some embodiments.

In some embodiments, entangled states of multiple photonic qubits can be created by coupling modes of two (or more) qubits and performing measurements on other modes. By way of example, FIG. 7 shows a circuit diagram for a Bell state generator 700 that can be used in some dual-rail-encoded photonic embodiments. In this example, modes 732(1)-732(4) are initially each occupied by a photon (indicated by a wavy line); modes 732(5)-732(8) are initially vacuum modes. (Those skilled in the art will appreciate that other combinations of occupied and unoccupied modes can be used.)

A first-order mode coupling (e.g., implementing transfer matrix T of Eq. (9)) is performed on pairs of occupied and unoccupied modes as shown by mode couplers 731(1)-731(4). Thereafter, a mode-information erasure coupling (e.g., implementing a four-mode mode spreading transform as shown in FIG. 5) is performed on four of the modes (modes 732(5)-732(8)), as shown by mode coupler 737. Modes 732(5)-732(8) act as "heralding" modes that are measured and used to determine whether a Bell state was successfully generated on the other four modes 732(1)-732(4). For instance, detectors 738(1)-738(4) can be coupled to the modes 732(5)-732(8) after second-order mode coupler 737. Each detector 738(1)-738(4) can output a classical data signal (e.g., a voltage level on a conductor) indicating whether it detected a photon (or the number of photons detected). These outputs can be coupled to classical decision logic circuit 740, which determines whether a Bell state is present on the other four modes 732(1)-732(4). For example, decision logic circuit 740 can be configured such that a Bell state is confirmed (also referred to as "success" of the Bell state generator) if and only if a single photon was detected by each of exactly two of detectors 738(1)-738(4). Modes 732(1)-732(4) can be mapped to the logical states of two qubits (Qubit 1 and Qubit 2), as indicated in FIG. 7. Specifically, in this example, the logical state of Qubit 1 is based on occupancy of modes 732(1) and 732(2), and the logical state of Qubit 2 is based on occupancy of modes 732(3) and 732(4). It should be noted that the operation of Bell state generator 700 can be non-deterministic; that is, inputting four photons as shown does not guarantee that a Bell state will be created on modes 732(1)-732(4). In one implementation, the probability of success is 4/32.

In some embodiments, it is desirable to form cluster states of multiple entangled qubits (typically 3 or more qubits, although the Bell state can be understood as a cluster state of two qubits). One technique for forming larger entangled systems is through the use of an entangling measurement, which is a projective measurement that can be employed to create entanglement between systems of qubits. As used herein, "fusion" (or "a fusion operation" or "fusing") refers to a two-qubit entangling measurement. A "fusion gate" is a structure that receives two input qubits, each of which is typically part of an entangled system. The fusion gate performs a projective measurement operation on the input qubits that produces either one ("type I fusion") or zero ("type II fusion") output qubits in a manner such that the initial two entangled systems are fused into a single entangled system. Fusion gates are specific examples of a general class of two-qubit entangling measurements and are particularly suited for photonic architectures. Examples of type I and type II fusion gates will now be described.

Figure 8A:
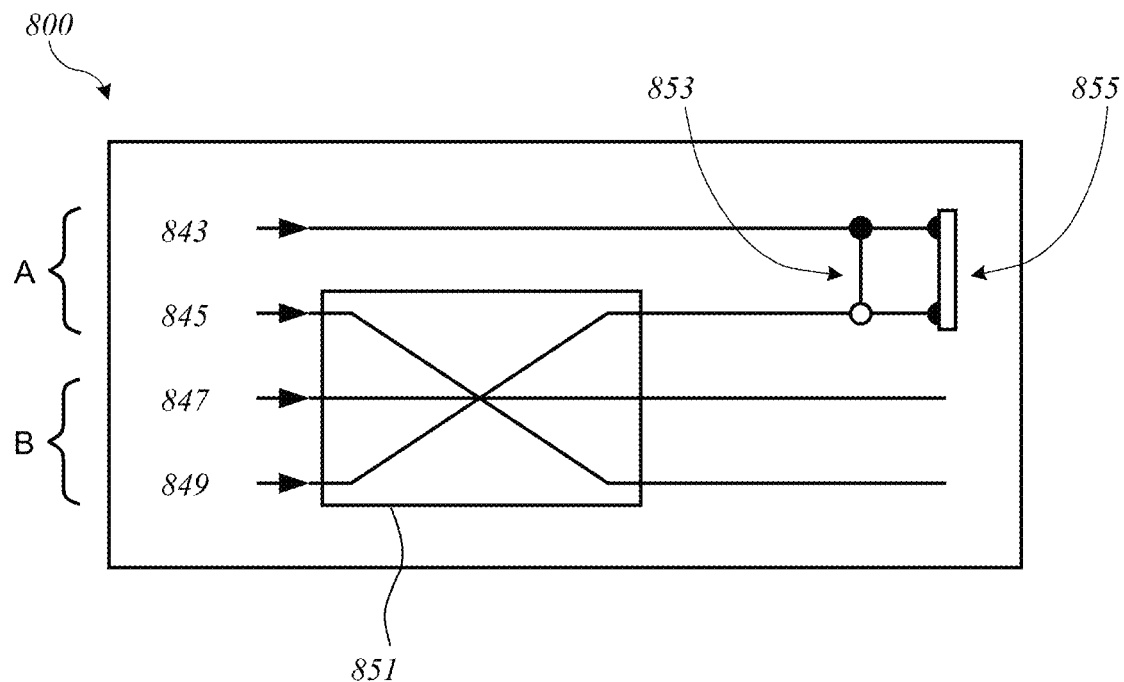
FIG. 8A shows a circuit diagram for a dual-rail-encoded type I fusion gate that can be used in some embodiments.

FIG. 8A shows a circuit diagram illustrating a type I fusion gate 800 in accordance with some embodiments. The diagram shown in FIG. 8A is schematic with each horizontal line representing a mode of a quantum system, e.g., a photon. In a dual-rail encoding, each pair of modes represents a qubit. In a photonic implementation of the gate the modes in diagrams such as that shown in FIG. 8A can be physically realized using single photons in photonic waveguides. Most generally, a type I fusion gate like that shown in FIG. 8A takes qubit A (physically realized, e.g., by photon modes 843 and 845) and qubit B (physically realized, e.g., by photon modes 847 and 849) as input and outputs a single "fused" qubit that inherits the entanglement with other qubits that were previously entangled with either (or both) of input qubit A or input qubit B.

Figure 8B:
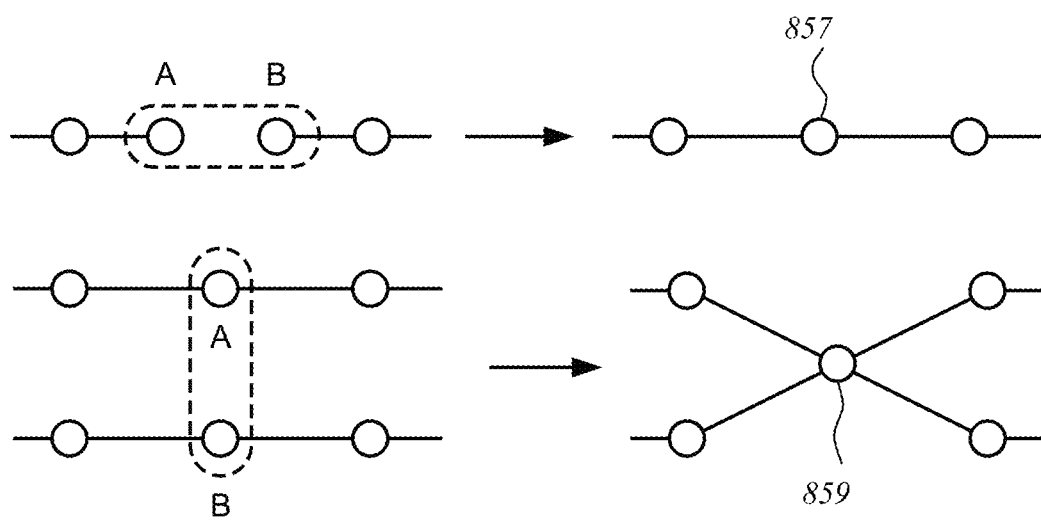
FIG. 8B shows example results of type I fusion operations using the gate of FIG. 8A.

For example, FIG. 8B shows the result of type-I fusing of two qubits A and B that are each, respectively, a qubit located at the end (i.e., a leaf) of some longer entangled cluster state (only a portion of which is shown). The qubit 857 that remains after the fusion operation inherits the entangling bonds from the original qubits A and B thereby creating a larger linear cluster state. FIG. 8B also shows the result of type-I fusing of two qubits A and B that are each, respectively, an internal qubit that belongs to some longer entangled cluster of qubits (only a portion of which is shown). As before, the qubit 859 that remains after fusion inherits the entangling bonds from the original qubits A and B thereby creating a fused cluster state. In this case, the qubit that remains after the fusion operation is entangled with the larger cluster by way of four other nearest neighbor qubits as shown.

Returning to the schematic illustration of type I fusion gate 800 shown in FIG. 8A, qubit A is dual-rail encoded by modes 843 and 845, and qubit B is dual-rail encoded by modes 847 and 849. For example, in the case of path-encoded photonic qubits, the logical zero state of qubit A (denoted $|0\rangle_A$) occurs when mode 843 is a photonic waveguide that includes a single photon and mode 845 is a photonic waveguide that includes zero photons (and likewise for qubit B). Thus, type I fusion gate 800 can take as input two dual-rail-encoded photon qubits thereby resulting in a total of four input modes (e.g., modes 843, 845, 847, and 849). To accomplish the fusion operation, a mode coupler (e.g., 50/50 beam splitter) 853 is applied between a mode of each of the input qubits, e.g., between mode 843 and mode 849 before performing a detection operation on both modes using photon detectors 855 (which includes two distinct photon detectors coupled to modes 843 and 849 respectively). In addition, to ensure that the output modes are adjacently positioned, a mode swap operation 851 can be applied that swaps the position of the second mode of qubit A (mode 845) with the position the second mode of qubit B (mode 849). In some embodiments, mode swapping can be accomplished through a physical waveguide crossing as described above or by one or more photonic switches or by any other type of physical mode swap.

FIG. 8A shows only an example arrangement for a type I fusion gate and one of ordinary skill will appreciate that the position of the mode coupler and the presence of the mode swap region 851 can be altered without departing from the scope of the present disclosure. For example, beam splitter 853 can be applied between modes 845 and 847. Mode swaps are optional and are not necessary if qubits having non-adjacent modes can be dealt with, e.g., by tracking which modes belong to which qubits by storing this information in a classical memory.

Type I fusion gate 800 is a nondeterministic gate, i.e., the fusion operation succeeds with a certain probability less than 1, and in other cases the quantum state that results is not a larger cluster state that comprises the original cluster states fused together to a larger cluster state. More specifically, gate 800 "succeeds," with probability 50%, when only one photon is detected by detectors 855, and "fails" if zero or two photons are detected by detectors 855. When the gate succeeds, the two cluster states that qubits A and B were a part of become fused into a single larger cluster state with a fused qubit remaining as the qubit that links the two previously unlinked cluster states (see, e.g., FIG. 8B). However, when the fusion gate fails, it has the effect of removing both qubits from the original cluster resource states without generating a larger fused state.

Figure 9A:
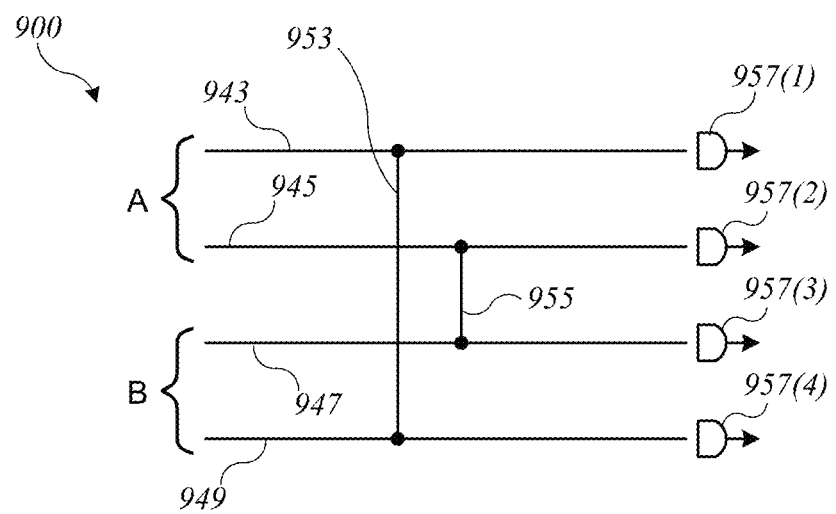
FIG. 9A shows a circuit diagram for a dual-rail-encoded type II fusion gate that can be used in some embodiments.

FIG. 9A shows a circuit diagram illustrating a type II fusion gate 900 in accordance with some embodiments. Like other diagrams herein, the diagram shown in FIG. 9A is schematic with each horizontal line representing a mode of a quantum system, e.g., a photon. In a dual-rail encoding, each pair of modes represents a qubit. In a photonic implementation of the gate the modes in diagrams such as that shown in FIG. 9A can be physically realized using single photons in photonic waveguides. Most generally, a type II fusion gate such as gate 900 takes qubit A (physically realized, e.g., by photon modes 943 and 945) and qubit B (physically realized, e.g., by photon modes 947 and 949) as input and outputs a quantum state that inherits the entanglement with other qubits that were previously entangled with either (or both) of input qubit A or input qubit B. (For type II fusion, if the input quantum state had N qubits, the output quantum state has N−2 qubits. This is different from type I fusion where an input quantum state of N qubits leads to an output quantum state having N−1 qubits.)

Figure 9B:
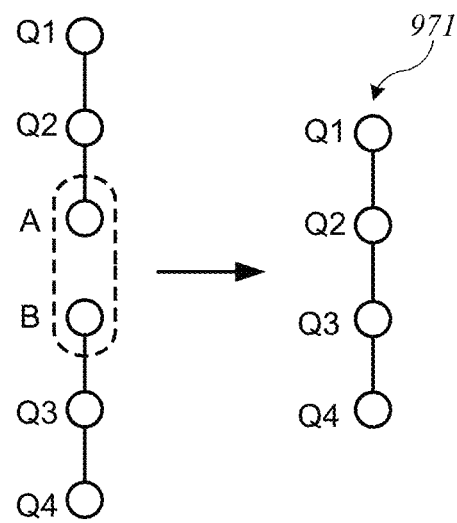
FIG. 9B shows an example result of a type II fusion operation using the gate of FIG. 9A.

For example, FIG. 9B shows the result of type-II fusing of two qubits A and B that are each, respectively, a qubit located at the end (i.e., a leaf) of some longer entangled cluster state (only a portion of which is shown). The resulting qubit system 971 inherits the entangling bonds from qubits A and B thereby creating a larger linear cluster state.

Returning to the schematic illustration of type II fusion gate 900 shown in FIG. 9A, qubit A is dual-rail encoded by modes 943 and 945, and qubit B is dual-rail encoded by modes 947 and 949. For example, in the case of path encoded photonic qubits, the logical zero state of qubit A (denoted $|0\rangle_A$) occurs when mode 943 is a photonic waveguide that includes a single photon and mode 945 is a photonic waveguide that includes zero photons (and likewise for qubit B). Thus, type II fusion gate 900 takes as input two dual-rail-encoded photon qubits thereby resulting in a total of four input modes (e.g., modes 943, 945, 947, and 949). To accomplish the fusion operation, a first mode coupler (e.g., 50/50 beam splitter) 953 is applied between a mode of each of the input qubits, e.g., between mode 943 and mode 949, and a second mode coupler (e.g., 50/50 beam splitter) 955 is applied between the other modes of each of the input qubits, e.g., between modes 945 and 947. A detection operation is performed on all four modes using photon detectors 957(1)-957(4). In some embodiments, mode swap operations (not shown in FIG. 9A) can be performed to place modes in adjacent positions prior to mode coupling. In some embodiments, mode swapping can be accomplished through a physical waveguide crossing as described above or by one or more photonic switches or by any other type of physical mode swap. Mode swaps are optional and are not necessary if qubits having non-adjacent modes can be dealt with, e.g., by tracking which modes belong to which qubits by storing this information in a classical memory.

FIG. 9A shows only an example arrangement for the type II fusion gate and one of ordinary skill will appreciate that the positions of the mode couplers and the presence or absence of mode swap regions can be altered without departing from the scope of the present disclosure.

The type II fusion gate shown in FIG. 9A is a nondeterministic gate, i.e., the fusion operation succeeds with a certain probability less than 1, and in other cases the quantum state that results is not a larger cluster state that comprises the original cluster states fused together to a larger cluster state. More specifically, the gate "succeeds" in the case where one photon is detected by one of detectors 957(1) and 957(4) and one photon is detected by one of detectors 957(2) and 957(3); in all other cases, the gate "fails." When the gate succeeds, the two cluster states that qubits A and B were a part of become fused into a single larger cluster state; unlike type-I fusion, no fused qubit remains (compare FIG. 8B and FIG. 9B). When the fusion gate fails, it has the effect of removing both qubits from the original cluster resource states without generating a larger fused state.

Figure 10:
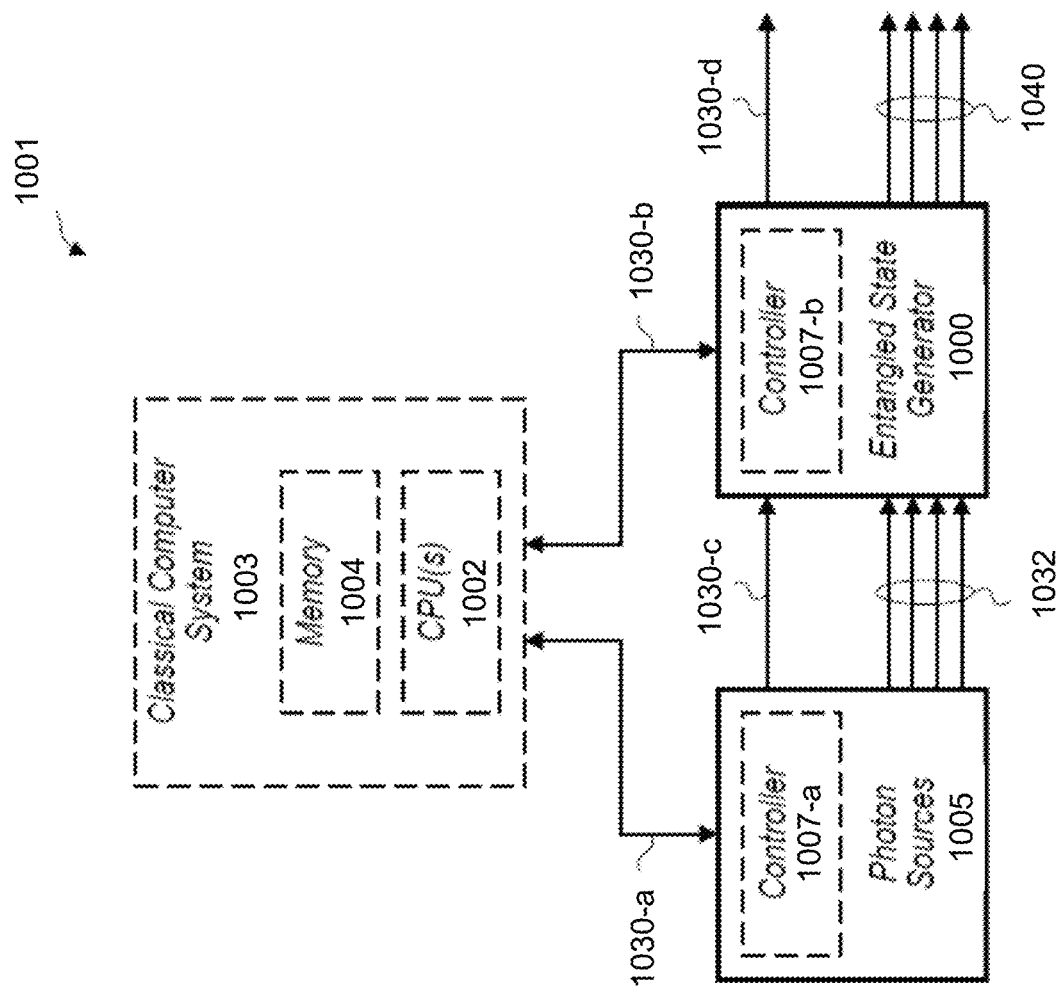
FIG. 10 illustrates an example of a qubit entangling system 1001 in accordance with some embodiments.

FIG. 10 illustrates an example of a qubit entangling system 1001 in accordance with some embodiments. Such a system can be used to generate qubits (e.g., photons) in an entangled state (e.g., a GHZ state, Bell pair, and the like), in accordance with some embodiments.

In an illustrative photonic architecture, qubit entangling system 1001 can include a photon source module 1005 that is optically connected to entangled state generator 1000. Both the photon source module 1005 and the entangled state generator 1000 may be coupled to a classical processing system 1003 such that the classical processing system 1003 can communicate and/or control (e.g., via the classical information channels 1030a-b) the photon source module 1005 and/or the entangled state generator 1000. Photon source module 1005 may include a collection of single-photon sources that can provide output photons to entangled state generator 1000 by way of interconnecting waveguides 1032. Entangled state generator 1000 may receive the output photons and convert them to one or more entangled photonic states and then output these entangled photonic states into output waveguides 1040. In some embodiments, output waveguide 1040 can be coupled to some downstream circuit that may use the entangled states for performing a quantum computation. For example, the entangled states generated by the entangled state generator 1000 may be used as resources for a downstream quantum optical circuit (not shown).

In some embodiments, system 1001 may include classical channels 1030 (e.g., classical channels 1030-a through 1030-d) for interconnecting and providing classical information between components. It should be noted that classical channels 1030-a through 1030-d need not all be the same. For example, classical channel 1030-a through 1030-c may comprise a bi-directional communication bus carrying one or more reference signals, e.g., one or more clock signals, one or more control signals, or any other signal that carries classical information, e.g., heralding signals, photon detector readout signals, and the like.

In some embodiments, qubit entangling system 1001 includes the classical computer system 1003 that communicates with and/or controls the photon source module 1005 and/or the entangled state generator 1000. For example, in some embodiments, classical computer system 1003 can be used to configure one or more circuits, e.g., using system clock that may be provided to photon sources 1005 and entangled state generator 1000 as well as any downstream quantum photonic circuits used for performing quantum computation. In some embodiments, the quantum photonic circuits can include optical circuits, electrical circuits, or any other types of circuits. In some embodiments, classical computer system 1003 includes memory 1004, one or more processor(s) 1002, a power supply, an input/output (I/O) subsystem, and a communication bus or interconnecting these components. The processor(s) 1002 may execute modules, programs, and/or instructions stored in memory 1004 and thereby perform processing operations.

In some embodiments, memory 1004 stores one or more programs (e.g., sets of instructions) and/or data structures. For example, in some embodiments, entangled state generator 1000 can attempt to produce an entangled state over successive stages, any one of which may be successful in producing an entangled state. In some embodiments, memory 1004 stores one or more programs for determining whether a respective stage was successful and configuring the entangled state generator 1000 accordingly (e.g., by configuring entangled state generator 1000 to switch the photons to an output if the stage was successful, or pass the photons to the next stage of the entangled state generator 1000 if the stage was not yet successful). To that end, in some embodiments, memory 1004 stores detection patterns (described below) from which the classical computing system 1003 may determine whether a stage was successful. In addition, memory 1004 can store settings that are provided to the various configurable components (e.g., switches) described herein that are configured by, e.g., setting one or more phase shifts for the component.

In some embodiments, some or all of the above-described functions may be implemented with hardware circuits on photon source module 1005 and/or entangled state generator 1000. For example, in some embodiments, photon source module 1005 includes one or more controllers 1007-*a* (e.g., logic controllers) (e.g., which may comprise field programmable gate arrays (FPGAs), application specific integrated circuits (ASICS), a "system on a chip" that includes classical processors and memory, or the like). In some embodiments, controller 1007-*a* determines whether photon source module 1005 was successful (e.g., for a given attempt on a given clock cycle, described below) and outputs a reference signal indicating whether photon source module 1005 was successful. For example, in some embodiments, controller 1007-*a* outputs a logical high value to classical channel 1030-*a* and/or classical channel 1030-*c* when photon source module 1005 is successful and outputs a logical low value to classical channel 1030-*a* and/or classical channel 1030-*c* when photon source module 1005 is not successful. In some embodiments, the output of control 1007-*a* may be used to configure hardware in controller 1007-*b*.

Similarly, in some embodiments, entangled state generator 1000 includes one or more controllers 1007-*b* (e.g., logical controllers) (e.g., which may comprise field programmable gate arrays (FPGAs), application specific integrated circuits (ASICS), or the like) that determine whether a respective stage of entangled state generator 1000 has succeeded, perform the switching logic described above, and output a reference signal to classical channels 1030-*b* and/or 1030-*d* to inform other components as to whether the entangled state generator 400 has succeeded.

In some embodiments, a system clock signal can be provided to photon source module 1005 and entangled state generator 1000 via an external source (not shown) or by classical computing system 1003 generates via classical channels 1030-*a* and/or 1030-*b*. In some embodiments, the system clock signal provided to photon source module 1005 triggers photon source module 1005 to attempt to output one photon per waveguide. In some embodiments, the system clock signal provided to entangled state generator 1000 triggers, or gates, sets of detectors in entangled state generator 1000 to attempt to detect photons. For example, in some embodiments, triggering a set of detectors in entangled state generator 1000 to attempt to detect photons includes gating the set of detectors.

It should be noted that, in some embodiments, photon source module 1005 and entangled state generator 1000 may have internal clocks. For example, photon source module 1005 may have an internal clock generated and/or used by controller 1007-*a* and entangled state generator 1000 has an internal clock generated and/or used by controller 1007-*b*. In some embodiments, the internal clock of photon source module 1005 and/or entangled state generator 1000 is synchronized to an external clock (e.g., the system clock provided by classical computer system 1003) (e.g., through a phase-locked loop). In some embodiments, any of the internal clocks may themselves be used as the system clock, e.g., an internal clock of the photon source may be distributed to other components in the system and used as the master/system clock.

In some embodiments, photon source module 1005 includes a plurality of probabilistic photon sources that may be spatially and/or temporally multiplexed, i.e., a so-called multiplexed single photon source. In one example of such a source, the source is driven by a pump, e.g., a light pulse, that is coupled into an optical resonator that, through some nonlinear process (e.g., spontaneous four wave mixing, second harmonic generation, and the like) may generate zero, one, or more photons. As used herein, the term "attempt" is used to refer to the act of driving a photon source with some sort of driving signal, e.g., a pump pulse, that may produce output photons non-deterministically (i.e., in response to the driving signal, the probability that the photon source will generate one or more photons may be less than 1). In some embodiments, a respective photon source may be most likely to, on a respective attempt, produce zero photons (e.g., there may be a 90% probability of producing zero photons per attempt to produce a single-photon). The second most likely result for an attempt may be production of a single-photon (e.g., there may be a 9% probability of producing a single-photon per attempt to produce a single-photon). The third most likely result for an attempt may be production of two photons (e.g., there may be an approximately 1% probability of producing two photons per attempt to produce a single photon). In some circumstances, there may be less than a 1% probability of producing more than two photons.

In some embodiments, the apparent efficiency of the photon sources may be increased by using a plurality of single-photon sources and multiplexing the outputs of the plurality of photon sources.

The precise type of photon source used is not critical and any type of source can be used, employing any photon generating process, such as spontaneous four wave mixing (SPFW), spontaneous parametric down-conversion (SPDC), or any other process. Other classes of sources that do not necessarily require a nonlinear material can also be employed, such as those that employ atomic and/or artificial atomic systems, e.g., quantum dot sources, color centers in crystals, and the like. In some cases, sources may or may be coupled to photonic cavities, e.g., as can be the case for artificial atomic systems such as quantum dots coupled to cavities. Other types of photon sources also exist for SPWM and SPDC, such as optomechanical systems and the like. In some examples the photon sources can emit multiple photons already in an entangled state in which case the entangled state generator 400 may not be necessary, or alternatively may take the entangled states as input and generate even larger entangled states.

For the sake of illustration, an example which employs spatial multiplexing of several non-deterministic is described as an example of a MUX photon source. However, many different spatial MUX architectures are possible without departing from the scope of the present disclosure. Temporal MUXing can also be implemented instead of or in combination with spatial multiplexing. MUX schemes that employ log-tree, generalized Mach-Zehnder interferometers, multimode interferometers, chained sources, chained sources with dump-the-pump schemes, asymmetric multi-crystal single photon sources, or any other type of MUX architecture can be used. In some embodiments, the photon source can employ a MUX scheme with quantum feedback control and the like.

The foregoing description provides an example of how photonic circuits can be used to implement physical qubits and operations on physical qubits using mode coupling between waveguides. In these examples, a pair of modes can be used to represent each physical qubit. Examples described below can be implemented using similar photonic circuit elements.

2. Generation of Entangled States

Many of the circuits described above are non-deterministic in operation, meaning that providing inputs in the correct state does not guarantee that a desired state will be output. For instance, if four photons are input into Bell state generator 700 of FIG. 7, a Bell state may be output only a fraction of the time (e.g., the probability of success may be 1/8 or 1/4 or the like). In the context of entangled state generator 1000 of FIG. 10 or other applications, the non-deterministic behavior of circuits incorporated therein can result in failing to reliably generate a desired entangled state.

One approach to improving reliability, described in section 2.1 below, is to use multiple instances of the non-deterministic circuits to perform multiple parallel attempts to generate a desired output state, thereby increasing the probability that at least one instance succeeds. An active multiplexing circuit, which can include optical switches regulated by control logic, can be used to select one instance that succeeded and couple the outputs of the selected instance to a circuit at the next stage. However, active switches can be lossy, and it may be desirable to limit the number of active switches through which a given photon passes. Accordingly, some embodiments implement a reduced-switching circuit architecture that can reduce the number of switches in a particular photon path to as few as two or even one. Examples of reduced-switching circuits and operation thereof are described in Section 2.2. Section 2.3 describes additional embodiments in which a reduced-switching circuit architecture can be applied in the context of quantum computing. It should be understood that circuits and methods of the kind described herein can be used in a variety of applications where generation of an entangled quantum system is desired.

2.1. A Multiplexing Approach to Generating Entangled Systems

Figure 11A:
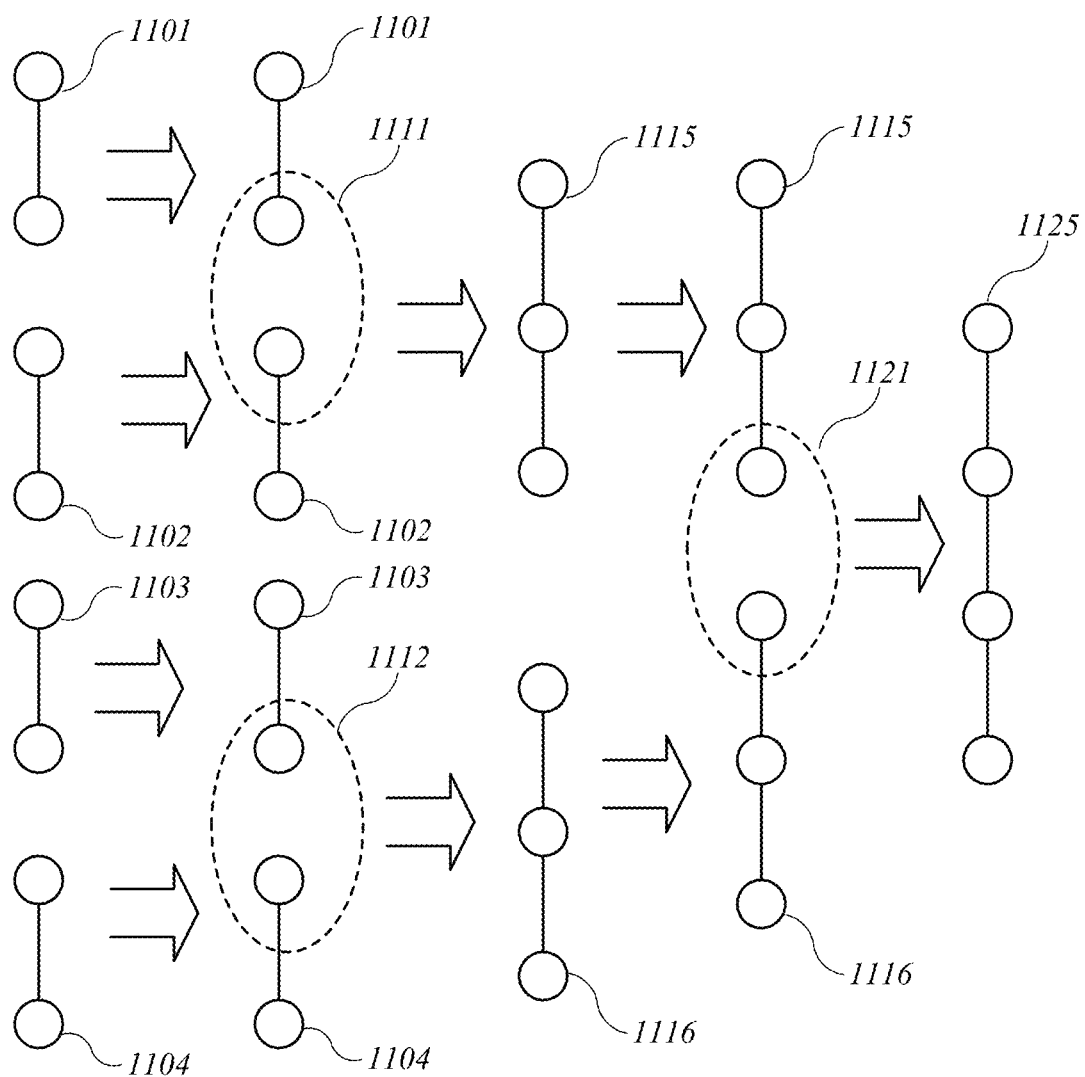
FIGS. 11A and 11B show conceptual models of a generating entangled systems of multiple qubits from smaller entangled systems using a "staged" approach.

FIG. 11A shows a conceptual model of generating an entangled system of multiple qubits from smaller entangled systems using a "staged" approach. In this example, qubits are represented as circles, and lines are used to show entanglement between qubits. Initially, four Bell pairs 1101-1104 are created, e.g., using the Bell state generator circuit of FIG. 7 or another similar circuit. A first type I fusion circuit 1111 (e.g., as described above with reference to FIGS. 8A and 8B) operates on one qubit of Bell pair 1101 and one qubit of Bell pair 1102, producing a first 3-GHZ state 1115, and a second type I fusion circuit 1112 operates on one qubit of Bell pair 1103 and one qubit of Bell pair 1104, producing a second 3-GHZ state 1116. A type II fusion circuit 1121 (e.g., as described above with reference to FIGS. 9A and 9B) operates on one "end" qubit of first 3-GHZ state 1115 and one "end" qubit of second 3-GHZ state 1116, producing a "4-line" state 1125.

Figure 11B:
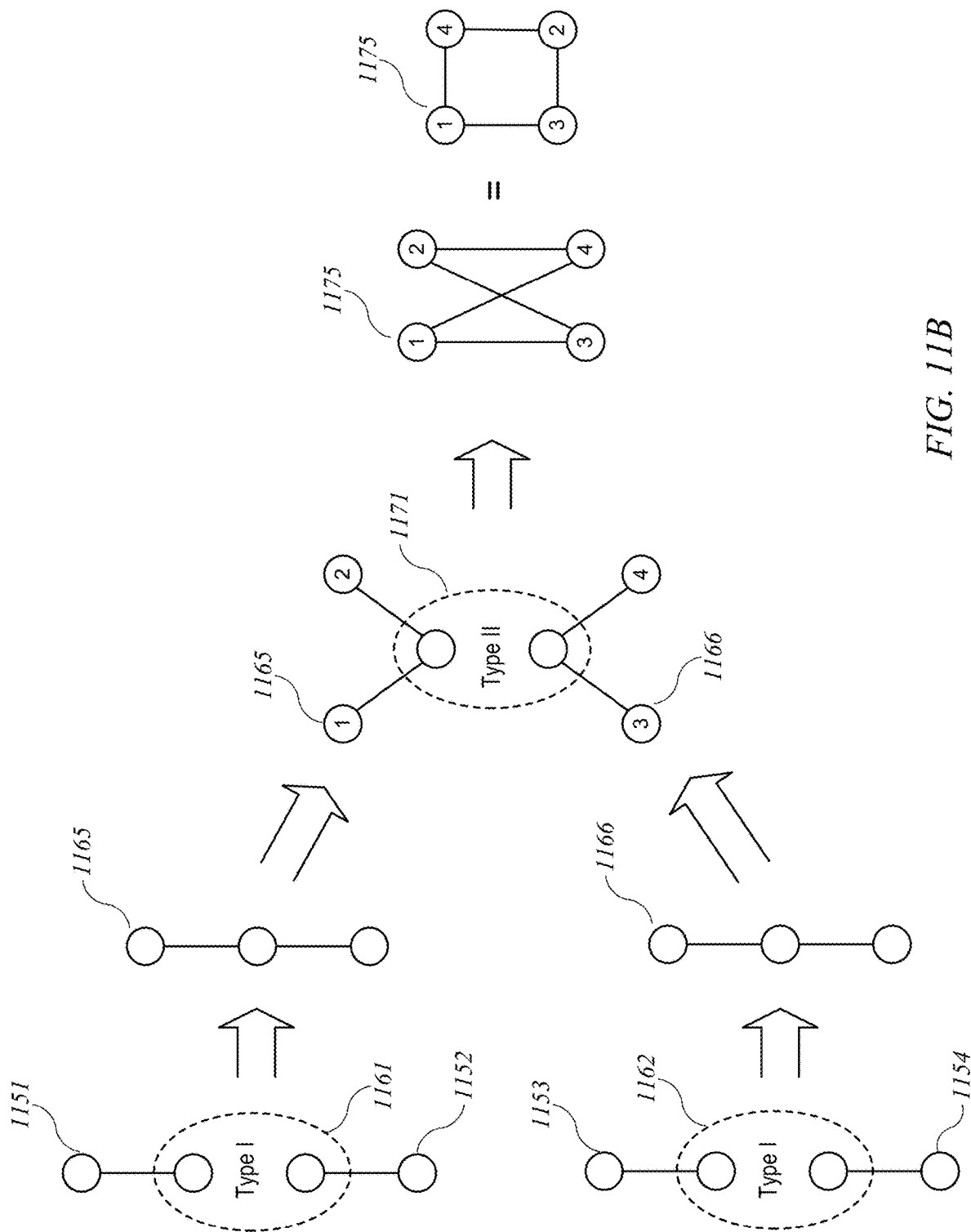

FIG. 11B shows a conceptual model of generating a different entangled system from smaller entangled systems. Initially, four Bell pairs 1151-1154 are created, e.g., using the Bell state generator circuit of FIG. 7 or another similar circuit. A first type I fusion circuit 1161 (e.g., as described above with reference to FIGS. 8A and 8B) operates on one qubit of Bell pair 1151 and one qubit of Bell pair 1152, producing a first 3-GHZ state 1165, and a second type I fusion circuit 1162 operates on one qubit of Bell pair 1153 and one qubit of Bell pair 1154, producing a second 3-GHZ state 1166. A type II fusion circuit 1171 operates on the "middle" qubit of first 3-GHZ state 1165 and the "middle" qubit of second 3-GHZ state 1166, producing a "4-ring" entangled state 1175. (Two views of 4-ring entangled state 1175 are shown; it should be understood that the two views are topologically equivalent.)

It should be understood that the examples of FIGS. 11A and 11B are illustrative. Entangled systems involving any number of qubits can be generated in a similar fashion. The general approach can be described as "staged," in the sense that a succession of operations are performed with each operation or circuit receiving two separately entangled systems as inputs and producing a single entangled system as output. The output system can be "larger" than each input system, in the sense of including more qubits and/or additional entanglement. This approach can be extended to include any number of stages to produce a final system. The final system can be subject to further operations, such as fusion with other systems and/or individual measurements of the constituent qubits.

In practice, operation of circuits such as Bell state generators and fusion circuits may be non-deterministic, meaning that the operation succeeds with a probability less than 1. To improve the probability of successfully generating an entangled system using a staged approach, a circuit architecture that provides multiple instances of each nondeterministic circuit and a selection mechanism (e.g., an active multiplexing circuit as described above) can be used to selectively propagate the output of a successful instance to the next stage.

Figure 12:
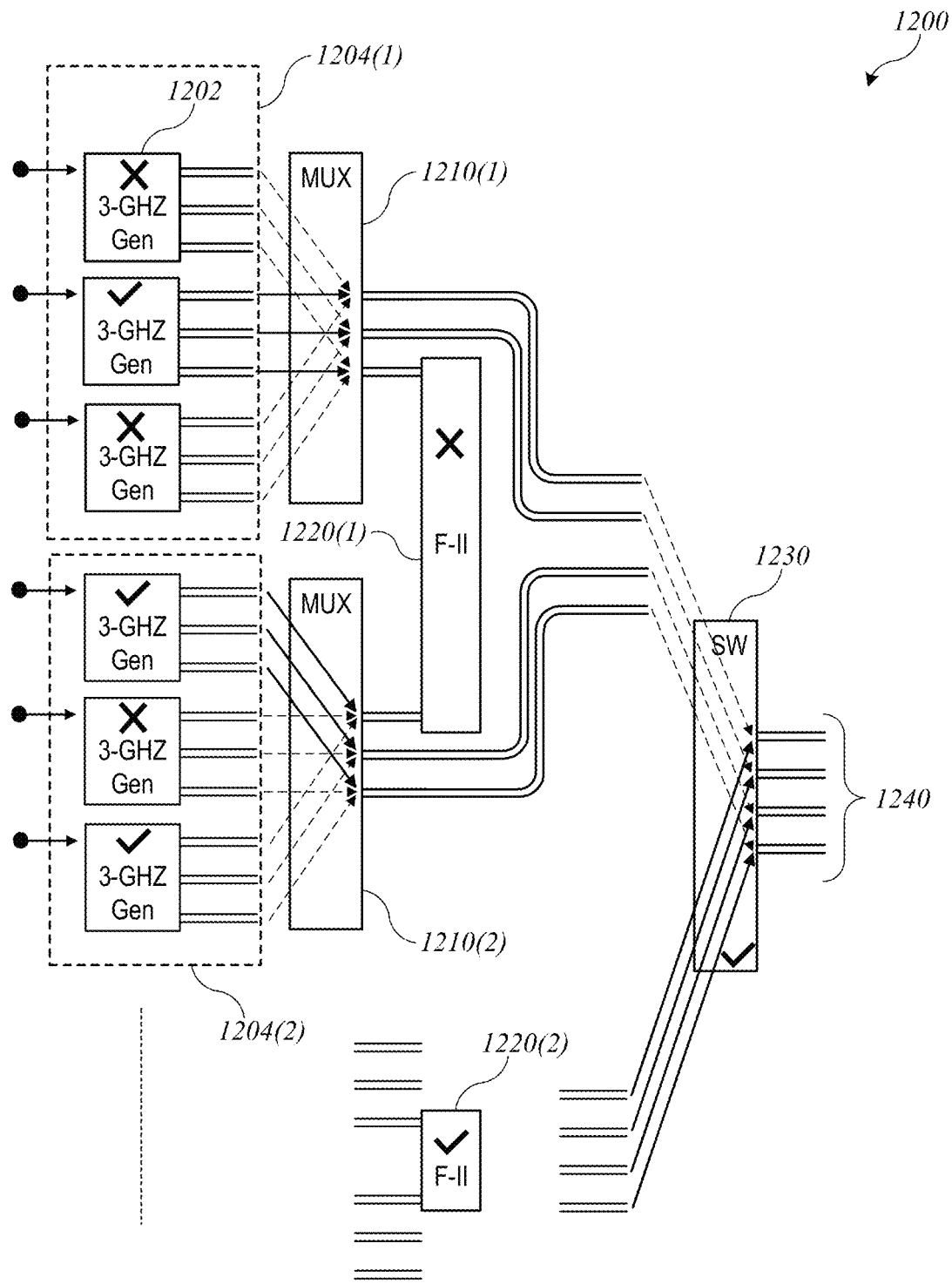
FIG. 12 shows a simplified schematic diagram of an optical circuit that implements the entanglement generation scheme of FIG. 11A.

FIG. 12 shows a simplified schematic diagram of an optical circuit 1200 that implements the entanglement generation scheme of FIG. 11A. Each instance of a 3-GHZ generation circuit 1202 receives a set of photons (e.g., eight photons) as inputs and produces a 3-GHz state as output. The photons can be generated using a set of nondeterministic single-photon generators and active multiplexing as described above; other techniques for providing a set of single photons on a set of waveguides can be used. Each instance of 3-GHZ generation circuit 1202 can include, e.g., a pair of Bell state generators and a type I fusion circuit that performs a type I fusion operation between the Bell pairs output by the Bell state generators. The outputs can be physically implemented as waveguides. In this example, each qubit is encoded using a pair of waveguides as described above; thus, each instance of 3-GHZ generation circuit 1202 has six waveguides (or three pairs of waveguides) as outputs. It is assumed that 3-GHZ generation circuit 1202 has a success probability less than 1, and each instance of 3-GHZ generation circuit 1202 can also have a classical output (not shown) indicating whether the operation succeeded or failed. For instance, as described above, the classical output can include signals indicating photon counts at each detector in the 3-GHZ generation circuit. A first active multiplexer (or switching network) 1210(1) can be coupled to the output waveguides from a first group 1204(1) of instances of 3-GHZ generation circuit 1202. The classical outputs of each instance of 3-GHZ circuit 1202 in group 1204 can be provided to classical control logic (not shown in FIG. 12), which can be implemented as described above with reference to FIG. 10 or as described below with reference to FIGS. 18A-18C. Based on the classical outputs of the instances of 3-GHZ generation circuit 1202 in group 1204(1), the classical control logic can control switching network 1210(1) such that the photons from the output waveguides of an instance of 3-GHZ generation circuit 1202 that succeeded (e.g., the middle instance, as indicated by the check mark) are coupled to the output waveguides of switching network 1210(1). A second switching network 1210(2) can operate similarly with regard to a second group 1204(2) of instances of 3-GHZ generation circuit 1202. In this manner, the output of each instance of switching network 1210 can correspond to a single 3-GHZ state.

A type II fusion circuit 1220(1) can operate on the two 3-GHZ states output by switching network instances 1210(1) and 1210(2) to produce a 4-line state as shown in FIG. 11A. Operation of type II fusion circuit 1220(1) may also be nondeterministic. Accordingly, to increase the probability of generating a 4-line state, a second instance of type II fusion circuit 1220(2) may also be provided. Although not expressly shown, type II fusion circuit 1220(2) can also receive input from switching networks similar to switching networks 1210(1) and 1210(2), each of which can operate on the outputs of a separate set of instances of 3-GHZ creation circuit 1202. A switching network 1230 can be used to select the output of an instance of type II fusion circuit 1220 that succeeded, and the final 4-line state can be provided at output waveguides 1240. It should be understood that the number of instances of each circuit, and accordingly the number of inputs into each switching network, can be varied as desired.

In circuit 1200, each photon that appears at outputs 1240 has passed through a series of active switches, including an instance of switching network 1210 and an instance of switching network 1220. Each active switch can introduce loss, which reduces the probability of creating the desired state at output waveguides 1230. Accordingly, it may be desirable to reduce the number of active switches encountered by a given photon en route to output waveguides 1230.

2.2. Generation of Entangled States with Reduced Switching

According to some embodiments, the number of active switches encountered by a photon propagating through an entanglement-generating circuit such as circuit 1200 can be reduced. In particular, active switching of any given mode can be avoided up to the point where that mode is to be input to a circuit that performs a measurement on the mode (e.g., a fusion circuit or any other circuit that incorporates a measurement). In some embodiments, a photon may propagate through (or "see") as few as one or two active switches between its creation in a photon source and a destructive measurement, regardless of the number of stages (or successive entanglement operations) in the entanglement-generating circuit.

Figure 13:
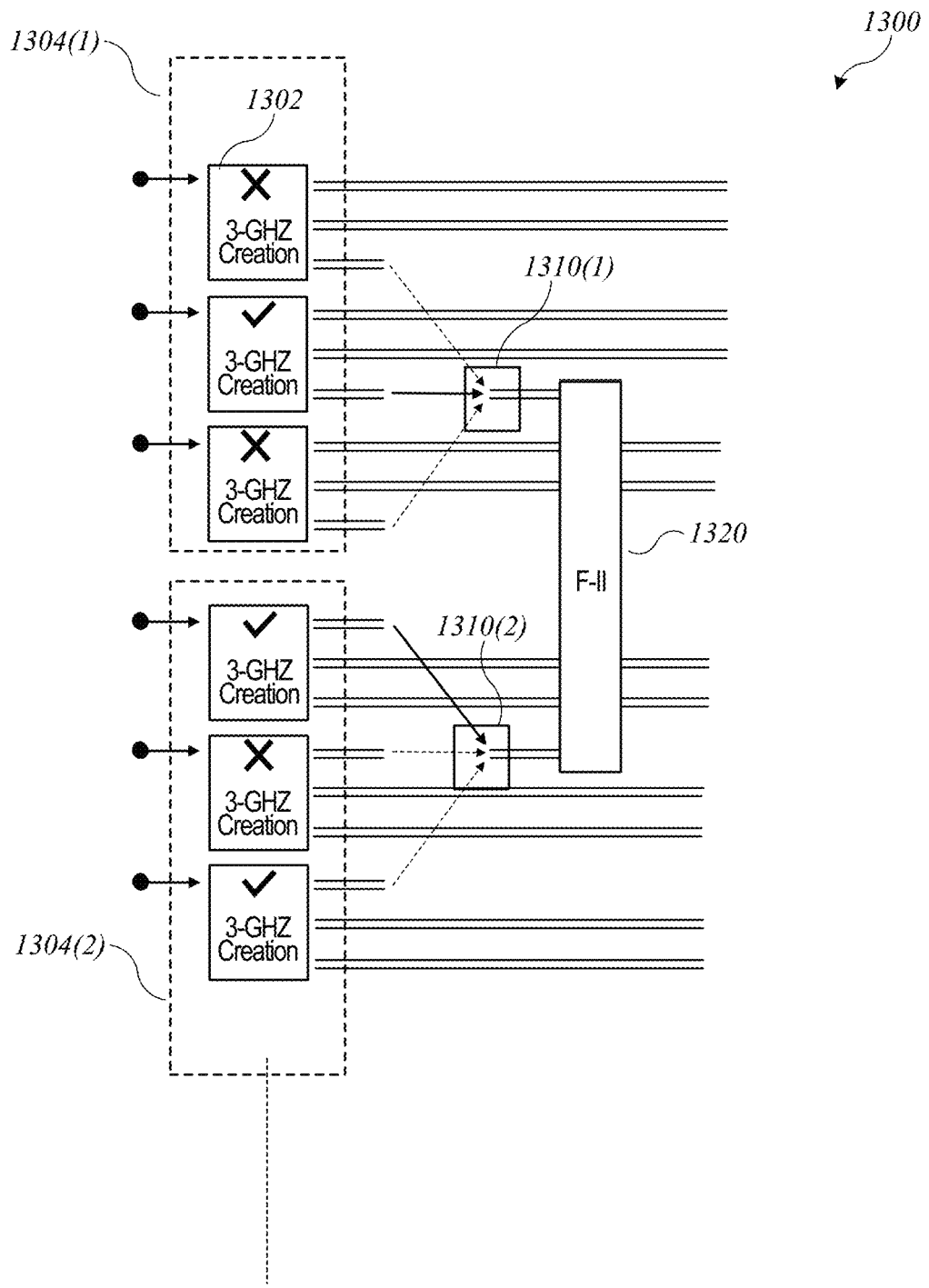
FIG. 13 shows an example of an optical circuit according to some embodiments.

FIG. 13 shows an example of an optical circuit 1300 according to some embodiments. Circuit 1300 implements the entanglement generation scheme of FIG. 11A and is in many respects similar to circuit 1200. However, compared to circuit 1200, circuit 1300 uses a reduced-switching architecture such that modes (or waveguides) that are not input to an active circuit (such as a fusion circuit) are not multiplexed. Instead all such modes can continue to propagate photons until either a stage at which the photons in those modes are input to an active circuit that consumes them or the photons reach a final output switching network. For instance 3-GHZ generation circuits 1300 can be similar or identical to 3-GHZ generation circuits 1200 described above, and each instance of 3-GHZ generation circuit 1300 can have six waveguides (or three pairs of waveguides) as outputs. A first switching network 1310(1) is coupled to just one waveguide pair from each instance of 3-GHZ generation circuit 1300 in first group 1304(1). A second switching network 1310(2) is coupled to just one waveguide pair from each instance of 3-GHZ generation circuit 1300 in second group 1304(2). The waveguide pairs that are coupled to switching networks 1310(1) and 1310(2) correspond to the qubits of the two 3-GHZ states that are to be fused by type II fusion circuit 1320. As described above, classical control logic can control operation of switching networks 1310(1) and 1310(2) so that type II fusion circuit 1320 receives qubits from two instances of 3-GHZ generation circuit that succeeded. Type II fusion circuit 1320 only operates on one qubit from each of the input 3-GHZ states. Modes representing the qubits not operated on by type II fusion circuit 1320 continue to propagate.

The circuit design principle illustrated by FIG. 13 can be understood as applying an active switch to a particular mode only when that mode is to be input to a circuit that makes a destructive measurement on that mode. Accordingly, in some embodiments, a circuit that generates entangled states may be designed such that some or all of the photons encounter only one active switch, which can be located just before it enters the circuit where it will be consumed. In some embodiments, a photon may encounter an additional switch at the time of creation. For instance, as described above a set of nondeterministic single photon sources can have their outputs actively multiplexed to reliably provide a single photon. However, switches at intermediate stages can be avoided.

Figure 14:
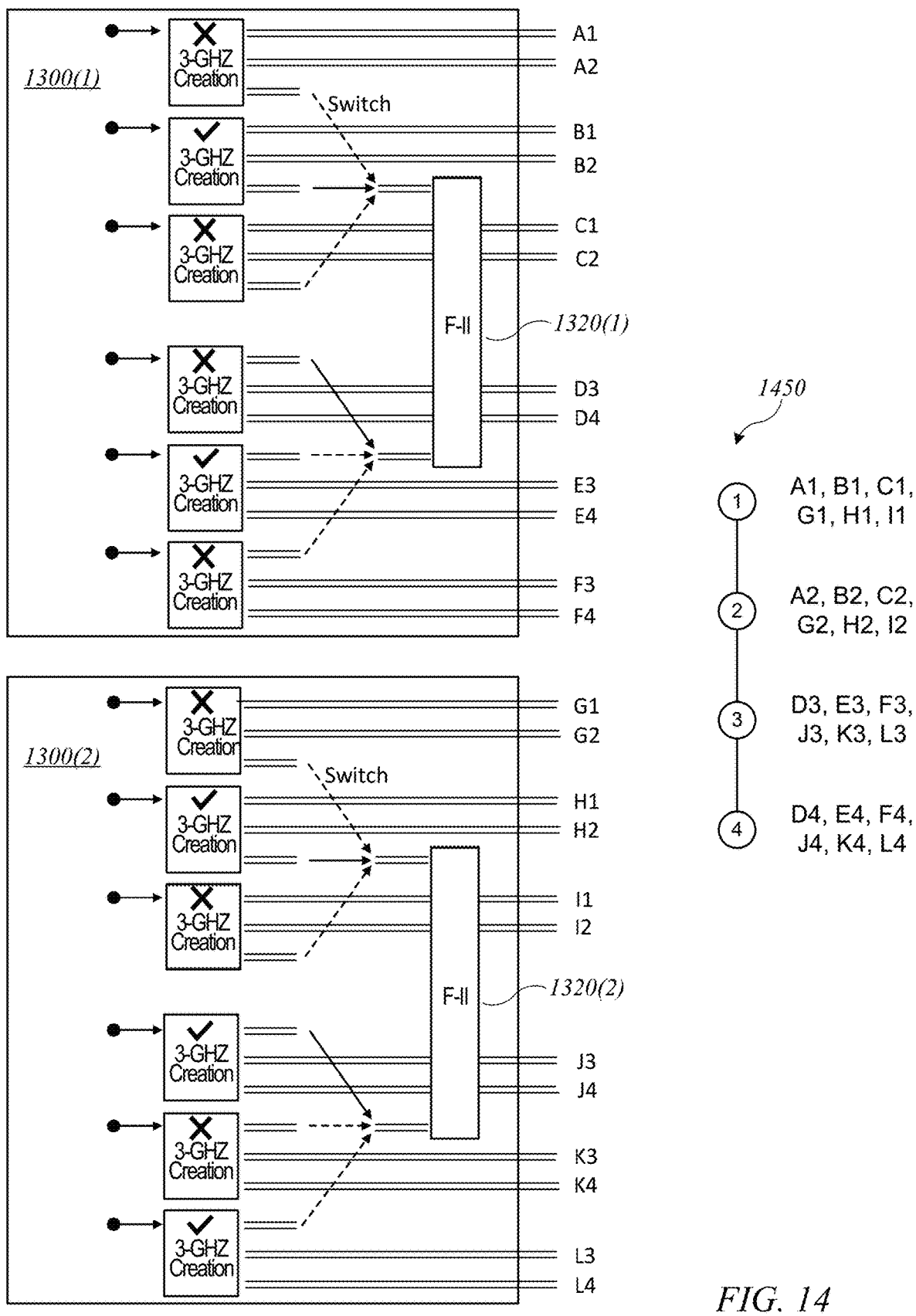
FIG. 14 shows a simplified schematic diagram of a circuit according to some embodiments.

At any given stage of generating entanglement, modes that are not operated upon can be propagated to later stages without active switching. For example, FIG. 14 shows a simplified schematic diagram of a circuit 1400 according to some embodiments. Circuit 1400 includes two instances of circuit 1300 of FIG. 13 operating in parallel. The output pair of waveguides (or modes) corresponding to each qubit are labeled as A1, A2, B1, B2, etc. As described above, each instance of circuit 1300 can produce a 4-line state 1450 but may do so nondeterministically. Thus, for any particular instance of operation, it is possible that the 4-line state 140 is present on modes {A1, A2, D3, D4} or on modes {A1, A2, E3, E4} or on modes {B1, B2, D3, D4} and so on. Only one instance of fusion circuit 1320 is selected as the successful instance, and the allowed combinations of modes are limited accordingly. In the particular example shown, fusion circuit 1320(1) operates on outputs of instance "B" and instance "D" of 3-GHZ generation circuit 1300; if fusion circuit 1320(1) succeeds, a 4-line state is created on modes {B1, B2, D3, D4}. Similarly, fusion circuit 1320(2) operates on outputs of instance "H" and instance "J" of 3-GHZ generation circuit 1300; if fusion circuit 1320(2) succeeds, a 4-line state is created on modes {H1, H2, J3, J4}. Other combinations are possible.

Figure 15:
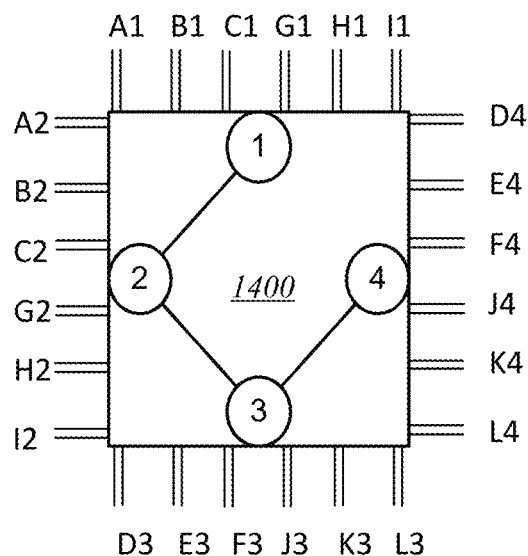
FIG. 15 shows an alternative schematic representation of the circuit of FIG. 14.
Figure 16:
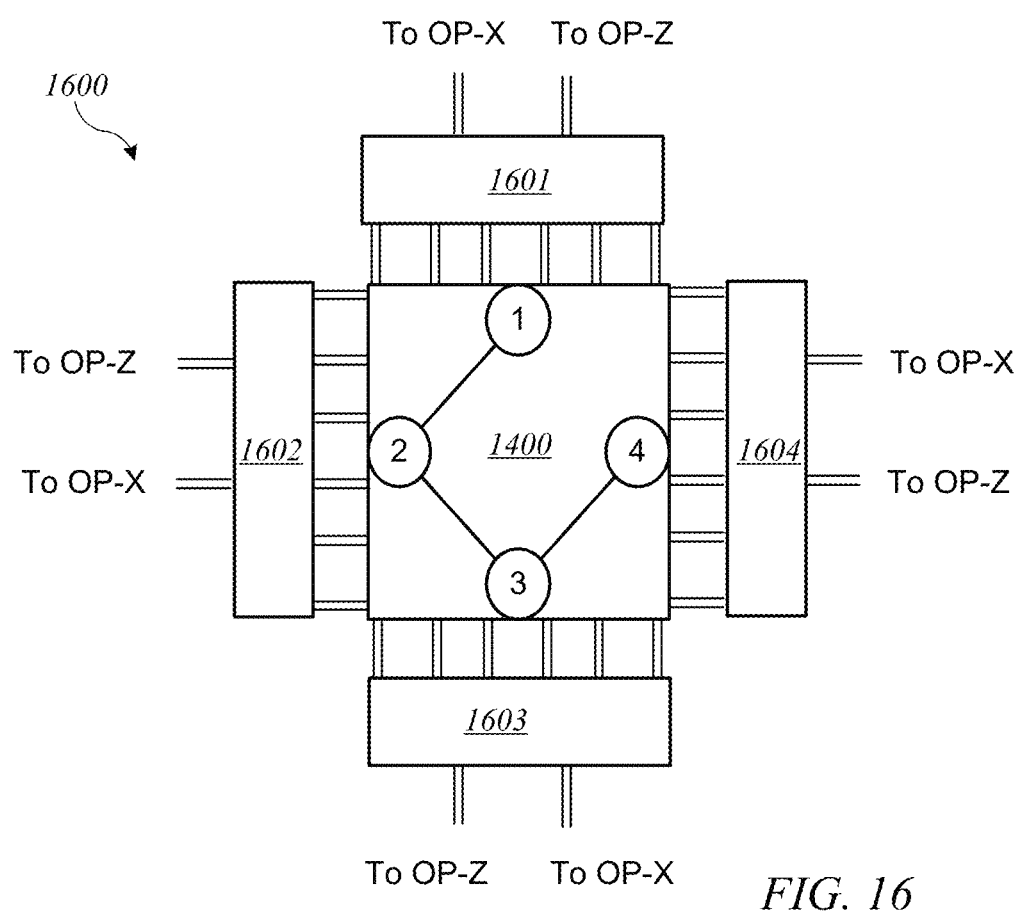
FIG. 16 shows a system incorporating the circuit of FIG. 14 according to some embodiments.

To select a single 4-line state 1450 for further operation, an additional switching network can be applied. FIGS. 15 and 16 illustrate an example of an switching network applied to select a set of output modes corresponding to 4-line state 1450 according to some embodiments. FIG. 15 shows a simplified schematic representation of circuit 1400, focusing on the outputs, which have been labeled to match the labeling scheme in FIG. 14. Circuit 1400 is represented as a box that generates 4-line state 1450, and the output modes are arranged around the edges of box 1502 such that the outputs that may be selected as qubit 1 of 4-line state 1450 are arranged along a first side of box 1502, outputs that may be selected as qubit 2 of 4-line state 1450 are arranged along a second side of box 1502, and so on. (It should be understood that FIG. 15 and all other circuit diagrams herein are schematic and not necessarily indicative of a physical arrangement of components.)

FIG. 16 shows a circuit 1600 according to some embodiments. Circuit 1600 includes an instance of circuit 1400 (represented as a box as in FIG. 15) and a switching network 1601-1604 connected to each group of outputs of circuit 1400. Switching networks 1601-1604 in this example are 6×2 active multiplexers. The inputs to switching network 1601 are the six waveguide pairs that could correspond to qubit 1 of 4-line state 1450. Two output paths are provided, and each output path can be coupled to a different downstream circuit that performs a different operation. (For example, "OP-X" can refer to a circuit that performs a type II fusion that fails with single qubit measurements in the Pauli X basis, and "OP-Z" can refer to a circuit that provides a type II fusion operation that fails with single qubit measurements in the Pauli Z basis. Other operations and combinations of operations are possible.) Operation of switching network 1601 can be controlled using classical control logic (not shown in FIG. 16) that selects an input based on classical output signals from the components of circuit 1400. For example, the classical control logic can select a pair of input modes for switching network 1601 based on which instance of type II fusion circuit 1320 succeeded and on which instances of 3-GHZ generation circuit 1300 provided the inputs to the instance of type II fusion circuit 1320 that succeeded. In addition, the classical control logic can select a pair of output modes based on the desired operation to be performed on this particular instance of 4-line state 1450. Selection of output modes can be based on various considerations such as a desired quantum computation to be performed, information about success or failure of other operations (including operations in other instances of circuit 1400) and so on. The classical control logic can set the state of individual switches in switching network 1601 to couple the selected pair of input modes to the selected pair of output modes. Switching networks 1602-1604 can be controlled in the same manner.

Figure 17:
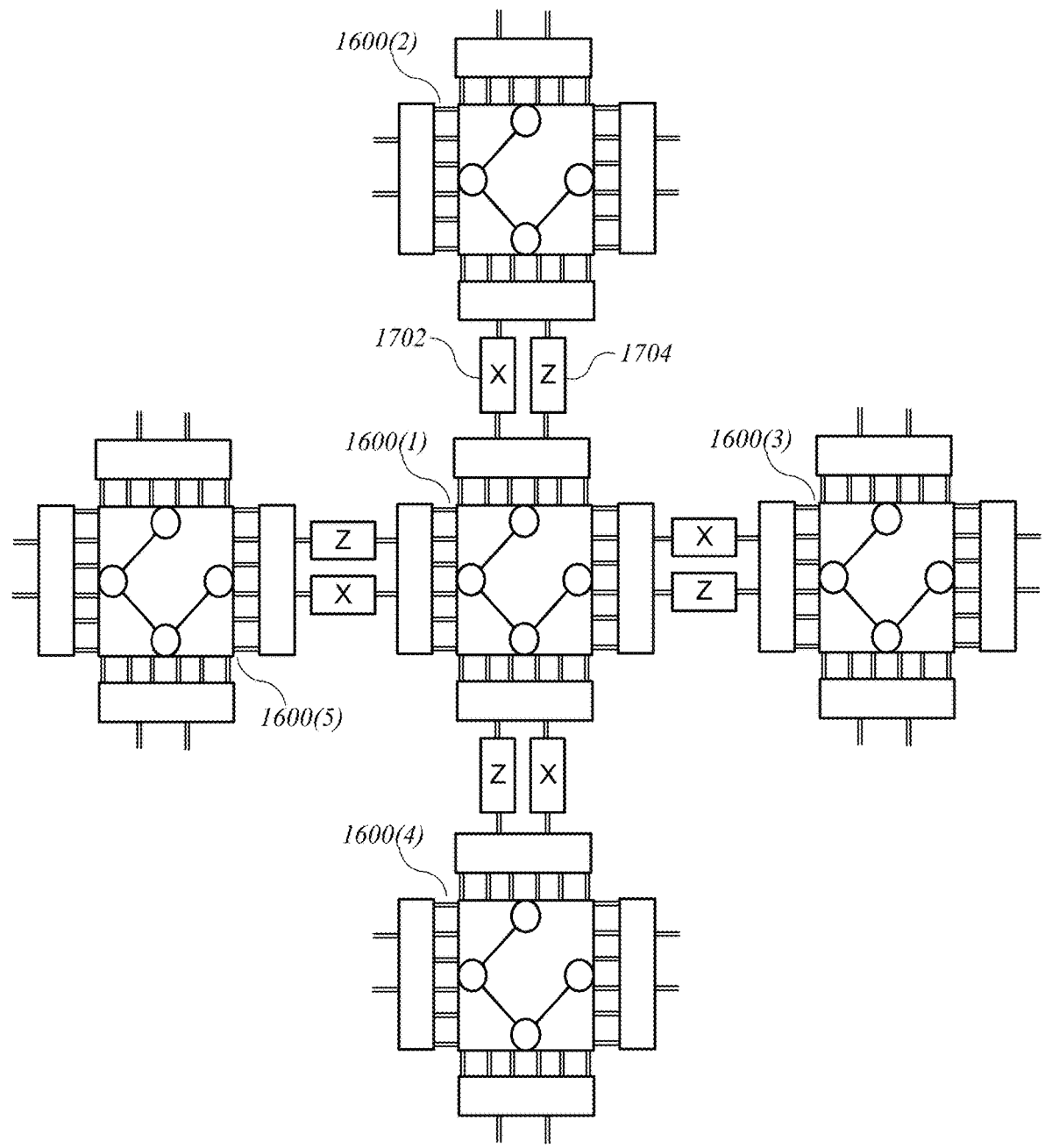
FIG. 17 shows an example of a lattice of instances of the system of FIG. 16 according to some embodiments.

In some embodiments, qubits output from different instances of circuit 1400 can be fused together in a final fusion and measurement operation. For example, a lattice of instances of circuit 1600 can be formed. FIG. 17 shows an example of a lattice of instances of circuit 1600 according to some embodiments. In this example, each qubit of 4-line state 1450 generated by circuit 1600(1) is subject to a "final" type II fusion operation with a qubit from a different neighboring instance of circuit 1600. (This is referred to as a "final" operation to suggest that all qubits from all instances of circuit 1600 can be consumed, leaving only classical measurement data.) In each case, the final type II fusion operation (indicated by boxes 1702, 1704) can be either X-basis or Z-basis, and the selection can be made independently for each pair of qubits. In some embodiments, the ability to select operations for each pair of qubits can enable programming of different quantum computations using the same optical circuits.

In the examples described above, switches are considered as applying (or not applying) to a qubit represented as a pair of modes. It should be understood that the same principle can apply to individual modes. For example, as described above with reference to FIG. 8A, a type I fusion circuit can be understood as operating on one of the two modes representing input qubit A and one of the two modes representing input qubit B. The two modes operated upon are consumed by detectors 855, while the other two modes (modes 845 and 847) continue to propagate, representing the output qubit of the type I fusion operation. Accordingly, where a type I fusion gate is implemented downstream of a switch network, the switch network can be configured to operate only on the modes that are consumed by the type I fusion gate.

Figure 18A:
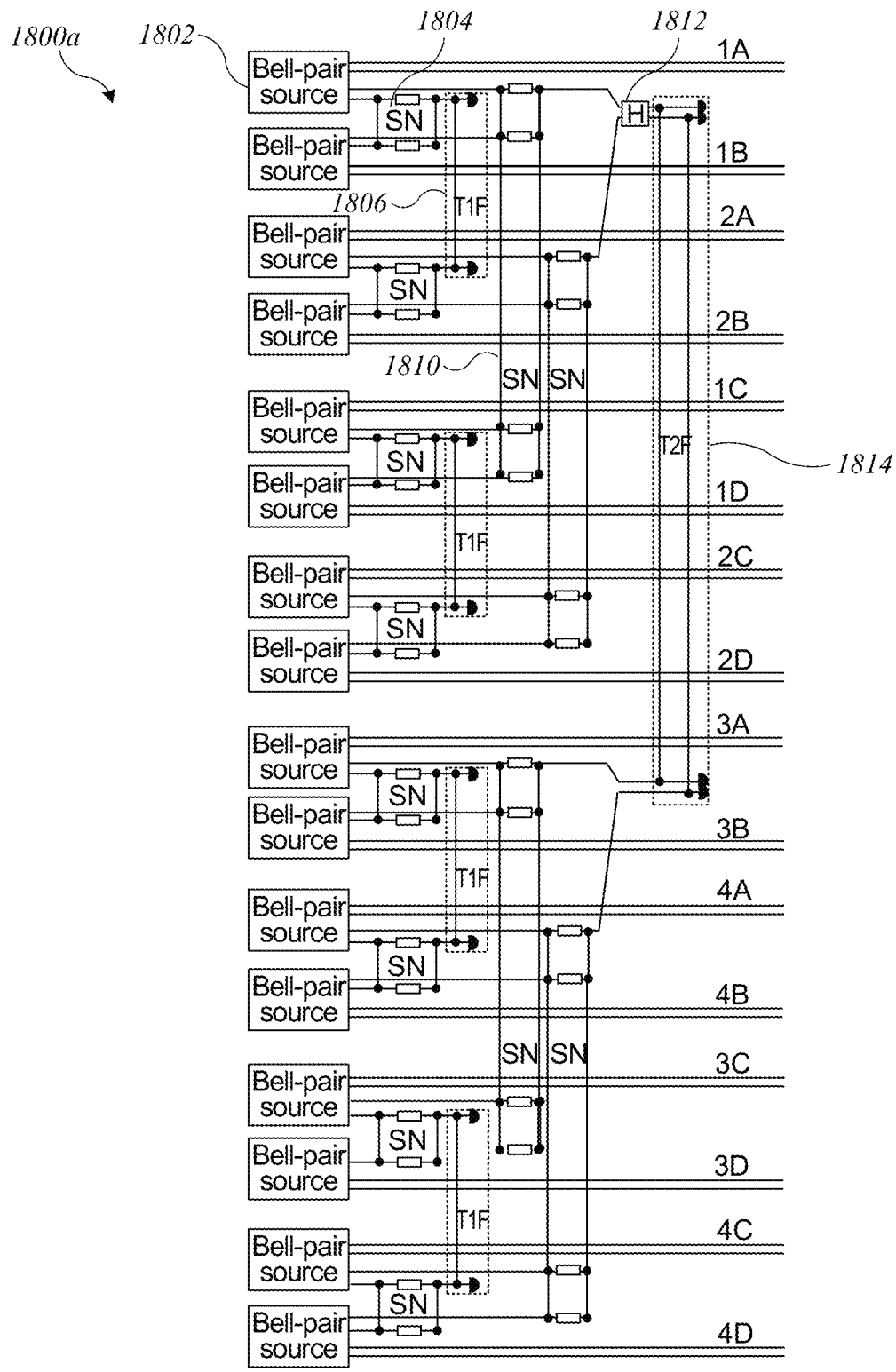
FIGS. 18A-18C show a simplified schematic diagram of a circuit according to some embodiments.
Figure 18B:
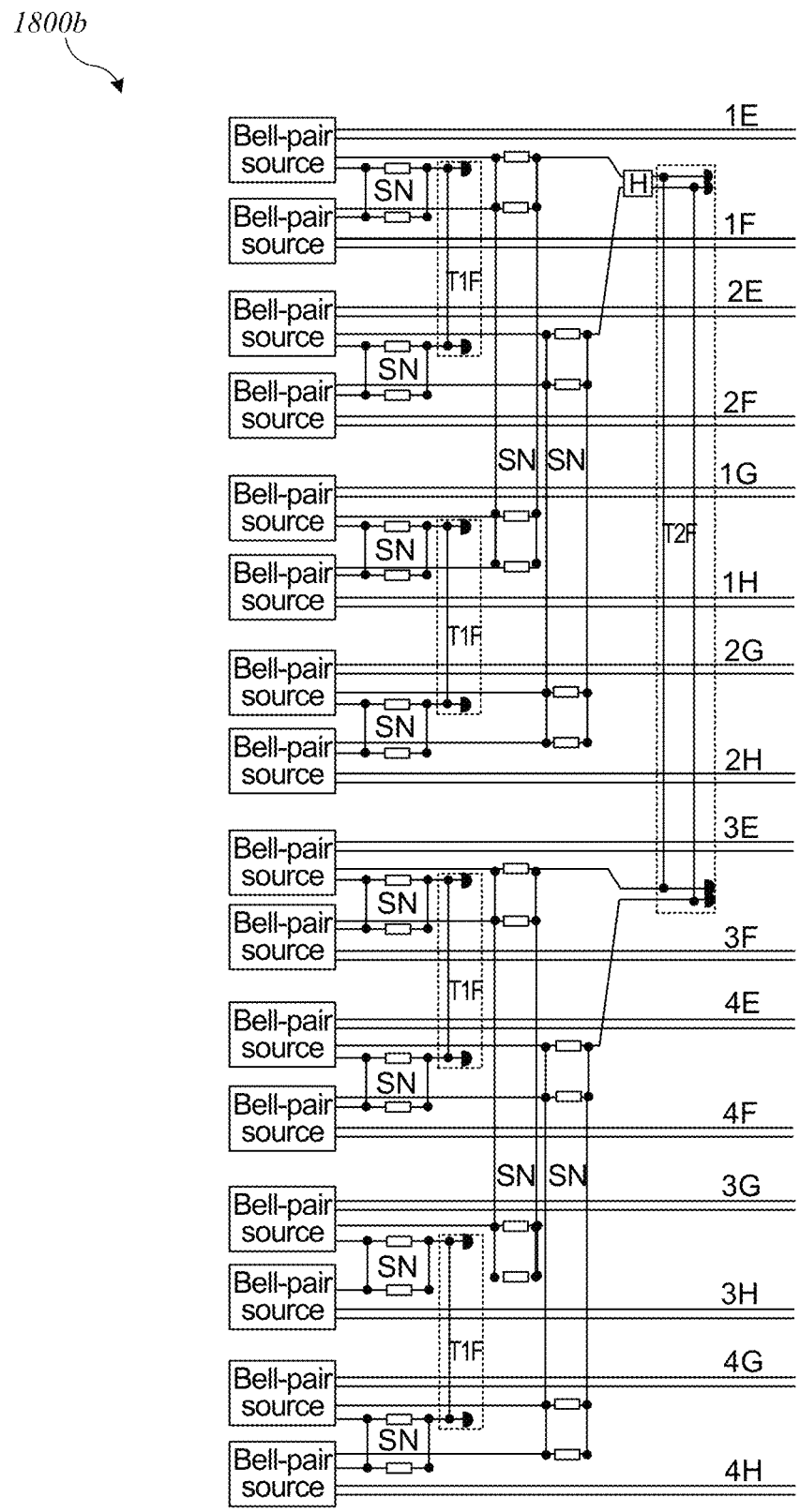
Figure 18C:
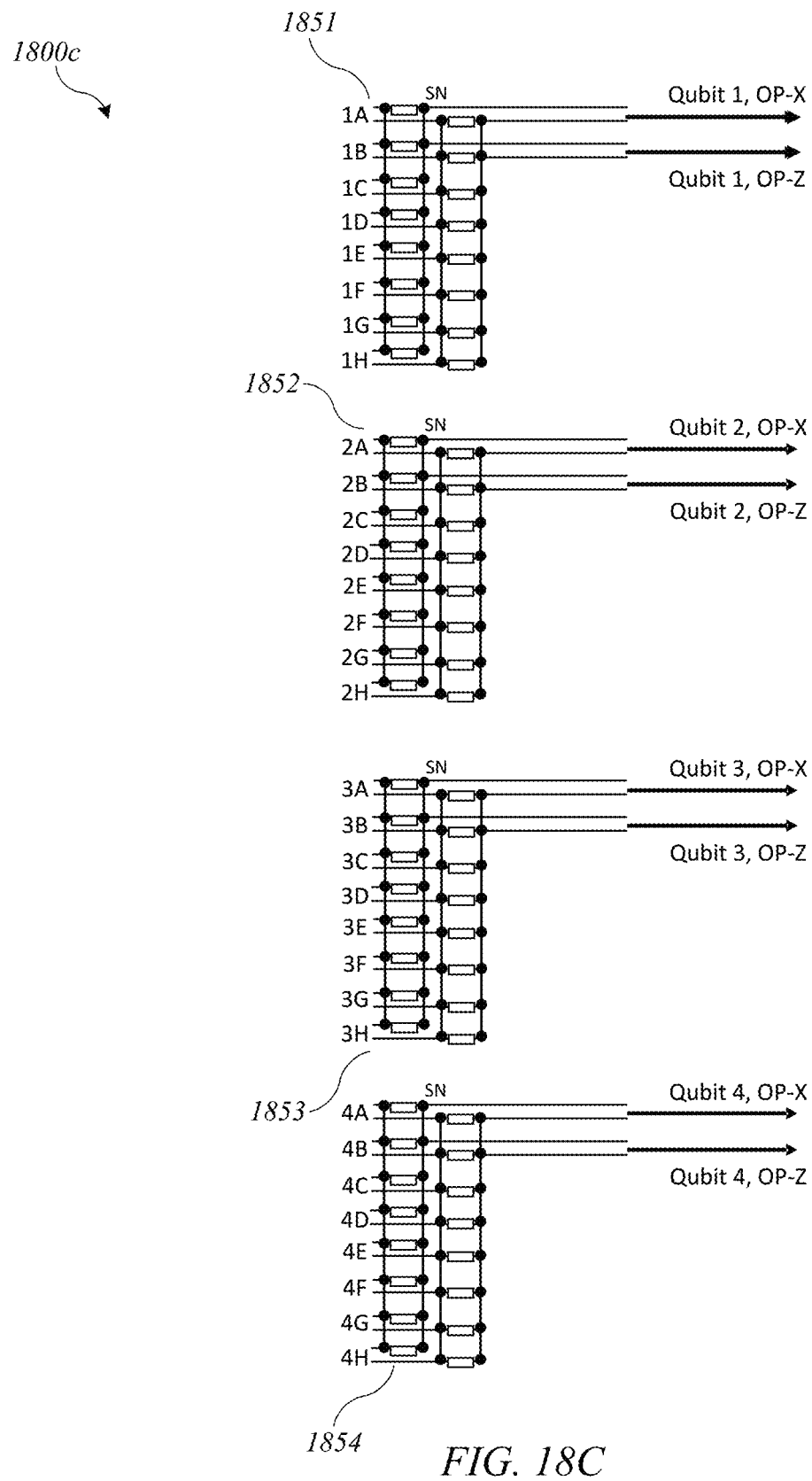

By way of example, FIGS. 18A-18C show a simplified schematic diagram of a circuit that can implement the sequence of operations shown in FIG. 11B to generate a 4-ring state 1175 according to some embodiments. FIG. 18A shows a sub-circuit 1800a that, if successful, generates a 4-ring state 1175. Sub-circuit 1800a includes a first set of Bell state generators 1802 (which can be implemented as described above). A switching network (SN) 1804 is applied to individual output modes from each pair of Bell state generators 1802, and the outputs of two instances of switching network 1804 are operated on by a type I fusion circuit 1806, thus producing a 3-GHZ state where the "middle" qubit is represented by one mode from each of the pair of Bell state generators. A switching network 1810 operates on the mode pair corresponding to the middle qubit of the 3-GHZ state, as described above. A (passive) Hadamard transfer matrix 1812 is applied to the middle qubit of one instance of the 3-GHZ state, and a type II fusion circuit 1814 is applied to the outputs of the two instances of switching network 1810 downstream of Hadamard transfer matrix 1812. Where type II fusion circuit 1814 succeeds, a 4-ring state 1175 is created. Depending on the state of switching networks 1810 and 1804, the 4-ring state may exist on modes {1A, 2A, 3C, 4C}, {1A, 2A, 3D, 4D} and so on.

FIG. 18B shows another sub-circuit 1800b that, if successful, generates a 4-ring state 1175. Sub-circuit 1800b has the same structure as sub-circuit 1800a.

FIG. 18C shows a sub-circuit 1800c that can operate on the outputs of sub-circuits 1800a and 1800b. Sub-circuit 1800c includes four switching networks 1851-1854, which can be similar to switching networks 1601-1604 described above. In this example, switching networks 1851-1854 are 8×2 networks rather than 6×2 networks.

It will be appreciated that the circuit examples described above are illustrative and that variations and modifications are possible. The particular entangled state generated by a circuit can be chosen as desired, and entangled systems can be generated using any sequence or combination of type I and/or type II fusion operations or other operations as desired. In some embodiments, a Bell state generator can be used to create entangled pairs of qubits and fusion operations can be applied to the Bell pairs to create larger entangled systems. Other implementations are also possible. In any circuit where an entangled system is generated in successive stages, the same principle can be applied: at each stage, an active switch is applied to the modes that are to be subject to measurement (or other destructive operation) at the next stage; modes not (yet) being operated on are not actively switched but instead continue to propagate until the mode reaches the stage where it is to be operated upon.

Figure 19:
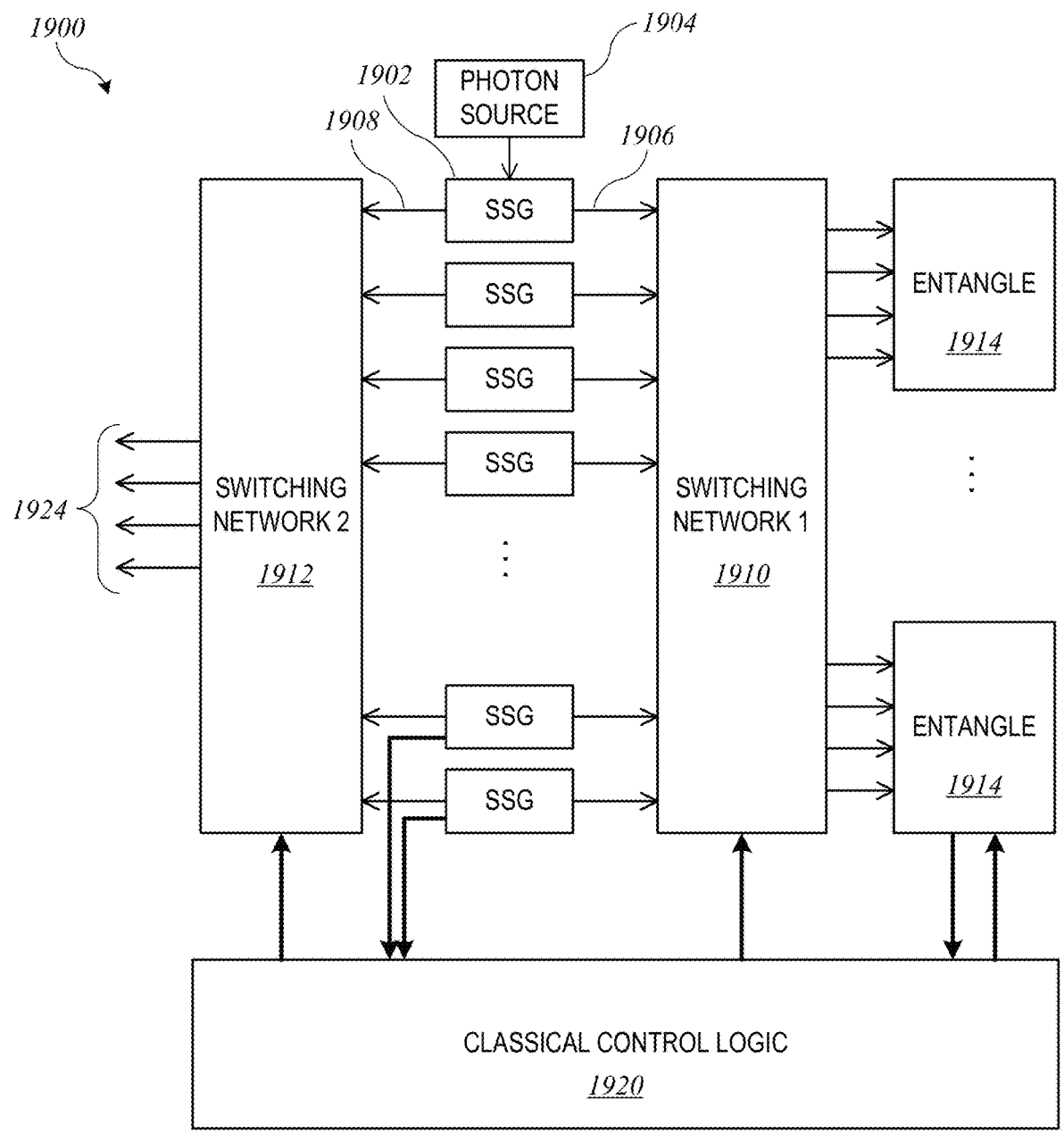
FIG. 19 shows a simplified high-level schematic diagram of a circuit for generating entangled quantum systems according to some embodiments.

FIG. 19 shows a simplified high-level schematic diagram of a circuit 1900 for generating entangled quantum systems according to some embodiments. Circuit 1900 implements a reduced-switching circuit architecture. Circuit 1900 includes a set of seed state generators 1902. Each seed state generator 1902 can be implemented as an optical circuit that receives photons from a photon source 1904. For clarity of illustration, only one instance of photon source 1904 is shown; however, it should be understood that any number of instances can be provided and that all instances of seed state generator 1902 receive photons. Each seed state generator 1902 can be or include an optical circuit that generates entanglement between received photons. For example, each seed state generator 1902 can be (or include) a Bell state generator or a 3-GHZ generator as described above. The quantum outputs of each seed state generator 1902 can include a group of modes on which the entangled quantum system can be encoded. For instance, as described above, each mode can be a waveguide on which a photon may or may not be propagating, depending on the state of the entangled quantum system. In some embodiments, a pair of modes can represent a qubit (as described above). In other embodiments, different encoding schemes can be used; for instance, a set of d modes can represent a qudit.

For purposes of description, the group of modes produced by each instance of seed state generator 1902 is said to include a set of "inner" modes 1906 (also sometimes referred to as "consumable" modes) and a set of "outer" modes 1908 (also sometimes referred to as "preservable" modes). As used herein, an "outer," or "preservable," mode is a mode that can contribute to a final entangled system output from a circuit such as circuit 1900, while an "inner," or "consumable," mode is a mode that is consumed (e.g., by destructive measurement) as part of the process of creating the final entangled system. In this context, the terms "inner" and "outer" may be understood as relating to entanglement geometry and are not intended to imply any particular spatial arrangement of modes or waveguides. In circuit 1900, inner modes 1906 propagate to a first switching network 1910 while outer modes 1908 propagate to a second switching network 1912.

Each instance of seed state generator 1902 also produces a classical "heralding" output indicative of whether the operations in seed state generator 1902 succeeded. The classical heralding output (also referred to as a heralding signal) can include, e.g., photon counts from detectors within seed state generator 1902, which can be used to determine whether generation of the seed state succeeded in a particular instance, e.g., as described above. Each instance of seed state generator 1902 can provide its classical heralding output to classical control logic 1920. (For clarity of illustration, the heralding output path is shown in FIG. 19 for only some instances of seed state generator 1902; however, it should be understood that classical control logic 1920 can receive heralding signals from each instance of seed state generator 1902.)

First switching network 1910 provides input modes, selected from the inner modes produced by various instances of seed state generator 1902, to a set of instances of an entanglement circuit 1914. For instance, as described above, first switching network 1910 can include active switches that selectably couple input modes of switching network 1910 to output modes of switching network 1910. In some embodiments, first switching network 1910 can be implemented as a set of active multiplexers, each coupled between a different subset of instances of seed state generator 1902 and one of the inputs to one of entanglement circuits 1914. (An example of this type of arrangement is shown in FIG. 13.) In other embodiments, first switching network 1910 can include an N×M active multiplexing network, where N is the number of instances of seed state generator 1902 and M is the total number of inputs to all instances of entanglement-generating circuits 1914. Other implementations are also possible.

First switching network 1910 operates responsively to classical control logic 1920. For example, classical control logic 1920 can receive the classical heralding signals from each instance of seed state generator 1902. Based on the classical heralding signals, classical control logic 1920 can determine which instances of seed state generator 1902 succeeded and can select the corresponding instances of inner modes 1906 to be coupled to inputs of entanglement circuits 1914. Classical control logic 1920 can send classical control signals to first switching network 1910 to configure the mode couplings (e.g., individual switches within first switching network 1910) according to the selection.

Each instance of entanglement circuit 1914 can include any combination of fusion circuits (including type I and/or type II fusion circuits as described above) and/or other circuits that can be used to create entanglement between two input quantum systems, each of which is an entangled system. In this example, it is assumed that entanglement circuit 1914 consumes all of its input modes, by measurement or other destructive operation on various modes. For instance, type II fusion circuits 1320 in circuit 1400 described above can correspond to entanglement circuit 1914 (or a portion thereof). In some embodiments, entanglement circuit 1914 can operate in stages, as described below with reference to FIG. 20. Each instance of entanglement circuit 1914 produces classical heralding signals as it operates; as with other classical heralding signals described herein, the classical heralding signals produced by entanglement circuit 1914 can include photon counts from detectors within entanglement circuit 1914.

Classical control logic 1920 can receive the classical heralding signals from each instance of entanglement circuit 1914 (this is shown in FIG. 19 for one instance, for clarity of illustration) and can use the heralding signals to determine whether various instances of entanglement-creating operations within a given instance of entanglement circuit 1914 succeeded or failed. This information can be used to control second switching network 1912. In embodiments where entanglement circuits 1914 operate in stages, classical control logic 1920 can also provide control signals to control later stages of each entanglement circuit 1914 based on heralding signals received from earlier stages of that entanglement circuit 1914.

Second switching network 1912 couples to a set of output paths 1924 for circuit 1900. Output paths 1924 can be implemented as a set of modes (e.g., waveguides) capable of representing an entangled quantum system that is constructed using seed state generators 1902 and entanglement circuit 1914. For instance, as described above, second switching network 1912 can include a network of active switches that selectably couple input modes of second switching network 1912 to output modes of second switching network 1912. In some embodiments, second switching network 1912 can be implemented as a set of active multiplexers, each coupled between an outer mode 1908 from each of a subset of instances of seed state generator 1902 and one of the output paths 1924. In some embodiments, multiple sets of output paths 1924 can be provided, and second switching network 1912 can select an output path for each mode as well as selecting an input mode. (Switching networks 1601-1604 of FIG. 16 are examples of this type of switching network.) Other configurations are also possible.

Second switching network 1912 operates responsively to classical control logic 1920. For example, classical control logic 1920 can use the classical heralding signals received from entanglement circuits 1914 and from seed state generators 1902 to select a set of outer modes 1908 that correspond to a successful instance of entanglement circuit 1914. Classical control logic 1920 can send classical control signals to second switching network 1912 to configure the mode couplings (e.g., individual switches within switching network 1912) according to the selection. In this manner, the desired output entangled system can be provided on output modes 1924.

In various embodiments, classical control logic 1920 can be implemented as a digital logic circuit with an arrangement of classical logic gates (AND, OR, NOR, XOR, NAND, NOT, etc.), such as a field programmable gate array (FPGA) or system-on-a-chip (SOC) having a programmable processor and memory, or an on-chip hard-wired circuit, such as an application specific integrated circuit (ASIC). In some embodiments, classical control logic 1920 can be implemented in an off-chip classical computer having a processor and a memory, and the off-chip classical computer can be programmed to perform some or all of the operations of classical control logic 1920. In some embodiments, classical control logic 1920 (which can include an off-chip classical computer) receives information (e.g., classical heralding signals) from each circuit instance of photon source 1904, seed state generator 1902, and entanglement circuit 1914 indicating whether various detectors in that circuit instance detected a photon (and optionally how many). Stated another way, control logic 1920 can receive a detection pattern for a detection operation from each instance of the various circuits that include detectors (e.g., in the form of analog detection signals or digital detection signals depending on the implementation of the detectors). Control logic 1920 executes logic that determines the total number and/or pattern of photons detected by the detectors and, based on the total number and/or pattern of photons detected, which instances of each circuit succeeded in producing a desired result. Based on such determinations, control logic 1920 can set the state of individual switches in switching networks 1910 and 1912 (and any other active switching networks that may be present).

Figure 20:
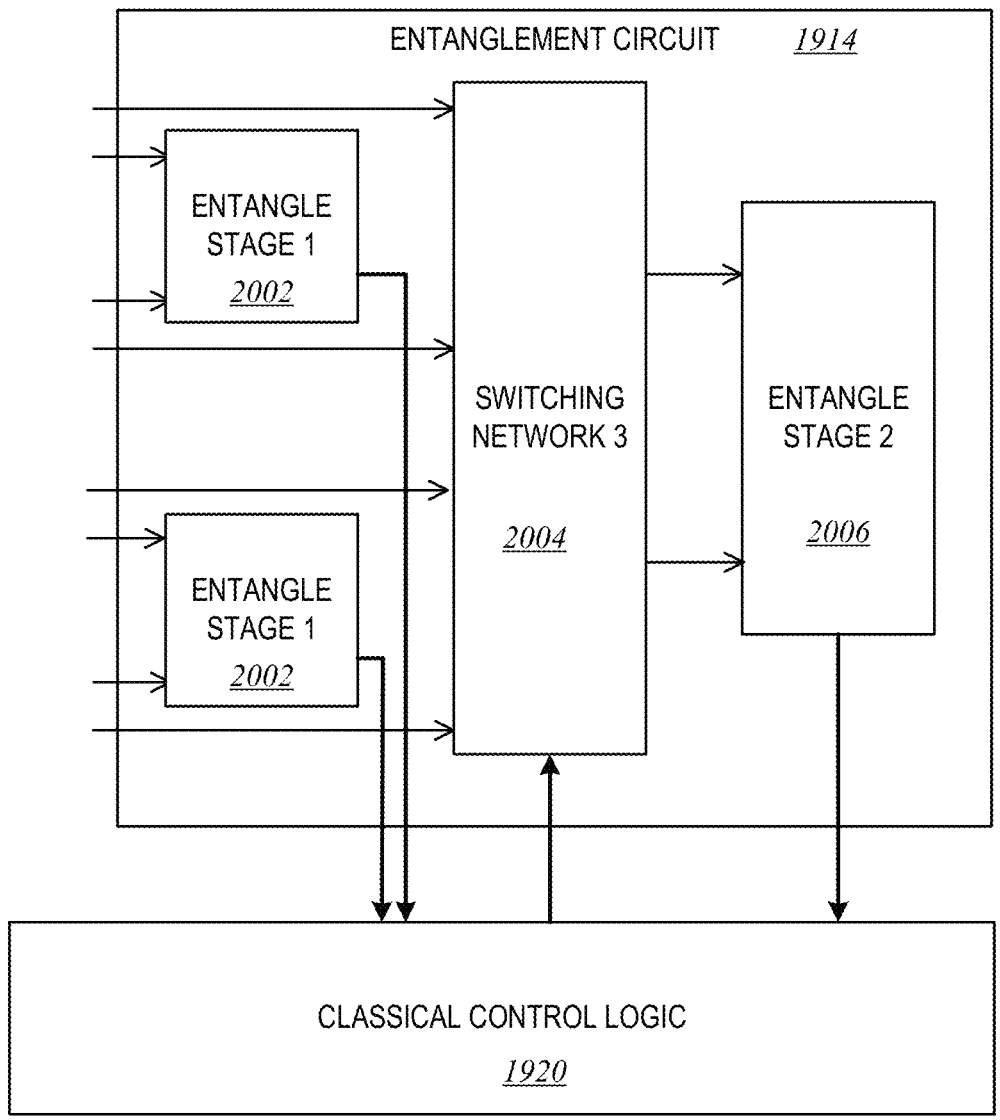
FIG. 20 shows a more detailed view of an instance of an entanglement circuit according to some embodiments.

As noted above, in some embodiments entanglement circuit 1914 operates in stages, with some inputs being consumed at each stage. The operations at each stage can be nondeterministic, and classical control logic 1920 can configure each successive stage according to the results of a previous stage (or multiple previous stages). FIG. 20 shows a more detailed view of an instance of entanglement circuit 1914 according to some embodiments. Entanglement circuit 1914 includes multiple instances (two are shown, but there may be any number) of a "stage 1" entanglement circuit 2002, a third switching network 2004, and a "stage 2" entanglement circuit 2006.

Each instance of stage-1 entanglement circuit 2002 operates on a different subset of the input modes to entanglement circuit 1914. Stage-1 entanglement circuit 2002 can be, for example, a type I fusion circuit or a type II fusion circuit. Modes input to stage-1 entanglement circuit 2002 are consumed (e.g., by destructive measurement as described above). Other modes are not operated on at stage 1 and can continue to propagate to third switching network 2004. Stage-1 entanglement circuits 2002 are assumed to be nondeterministic, and each instance of stage-1 entanglement circuit 2002 can produce one or more classical heralding signals indicative of success or failure of the operation in a given instance.

Third switching network 2004 can be implemented similarly to first switching network 1910 and second switching network 1912 described above. Classical control logic 1920 can control the state of third switching network 2004 based on heralding signals from the instances of stage-1 entanglement circuit 2002 and heralding signals from seed state generators 1902, so that the modes that are provided to stage-2 entanglement circuit 2006 are properly correlated with the modes that were used in a successful instance of stage-1 entanglement generator 2002.

Stage-2 entanglement circuit 2006 can be, for example, a type II fusion circuit (or a type I fusion circuit). Modes input to stage-2 entanglement circuit 2006 are consumed (e.g., by destructive measurement as described above). Stage-2 entanglement circuit 2006 is assumed to be nondeterministic, and each instance of stage-2 entanglement circuit 2006 can produce one or more classical heralding signals indicative of success or failure of the operation in a given instance. Classical control logic can receive the heralding signals from each instance of stage-2 entanglement circuit 2006. In this example, entanglement circuit 1914 has two stages, but the same principle can be extended to any number of stages.

Referring again to FIG. 19, first switching network 1910 and entanglement circuits 1914 can be understood as performing a number of parallel attempts to generate an entangled quantum system on the outer modes of a subset of seed state generators 1902 by operating on the inner modes (but not on the outer modes) of that subset of seed state generators 1902 Classical control logic 1920 receives heralding signals from each stage of the attempt and can determine, based on the heralding signals, which attempts succeeded. Based on that determination, classical control logic 1920 can select a set of outer modes that represent the desired entangled quantum system to be provided as outputs by second switching network 1912.

It should be noted that operation of first switching network 1910 and entanglement circuits 1914 consumes some (nonzero) amount of time. During that operating time, photons in outer modes 1908 can continue to propagate toward switching network 1912. For instance, a suitable length of waveguide (e.g., optical fiber or solid-state waveguide) can be provided so that photons in outer modes 1908 do not reach the inputs of second switching network 1912 before classical control logic 1920 is able to configure second switching network 1912 based on the heralding signals received from entanglement circuits 1914.

Figure 21:
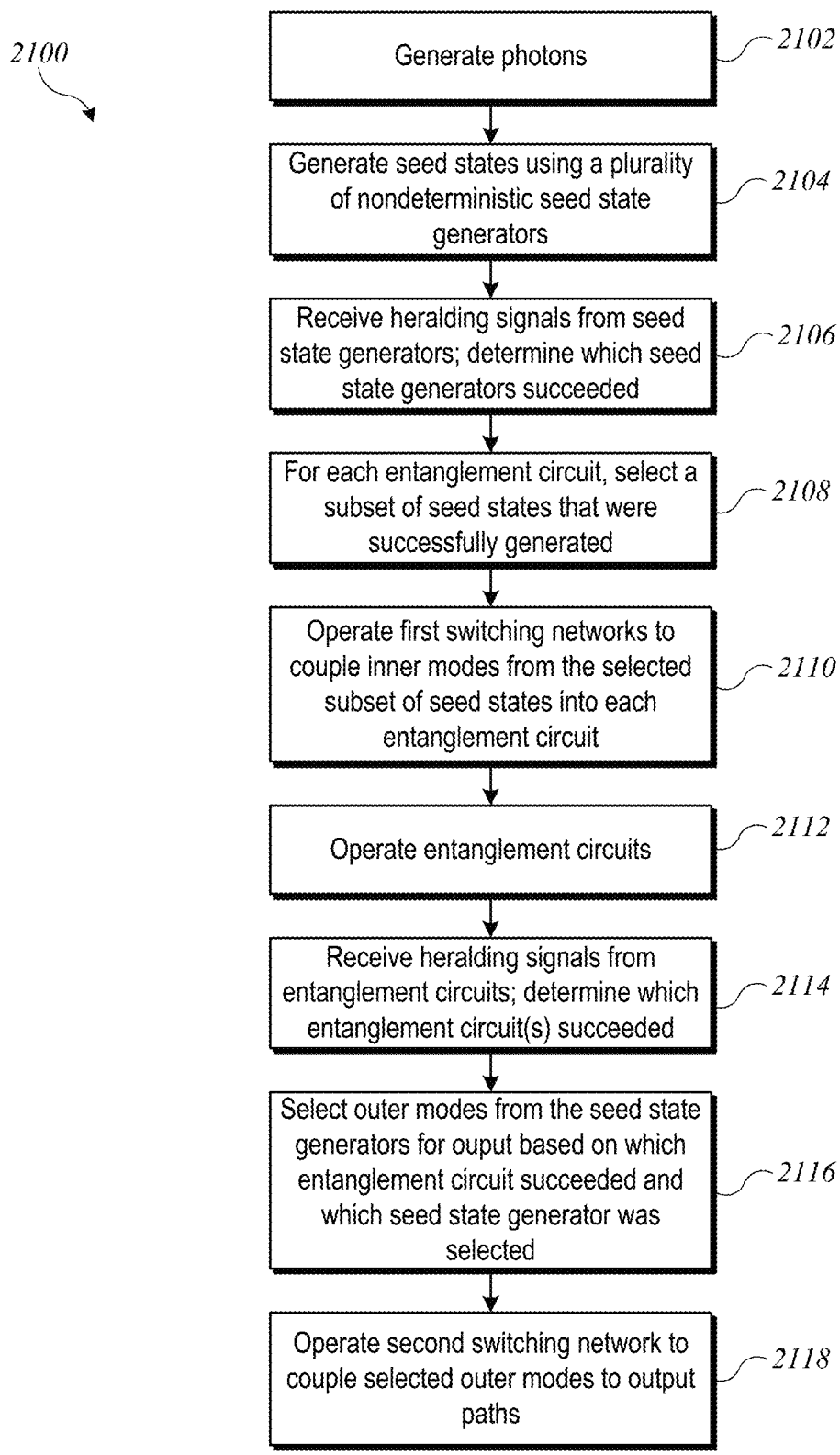
FIG. 21 shows a flow diagram of a process for operating optical circuits according to some embodiments.

A further understanding of the operation of circuits such as circuit 1900 can be had by reference to FIG. 21, which shows a flow diagram of a process 2100 of operating optical circuits according to some embodiments. At block 2102, photons are generated, e.g., as described above. At block 2104, seed states (e.g., Bell states or 3-GHZ states) can be generated from the photons using nondeterministic seed state generators (e.g., seed state generators 1902). At block 2106, classical control logic (e.g., classical control logic 1920) coupled to the seed state generators can receive classical heralding signals indicating whether each seed state generator succeeded or failed; accordingly, the classical control logic can determine which of the seed state generators succeeded. Thereafter, entanglement operations can be initiated. For example, at block 2108, for each entanglement circuit (e.g., each instance of entanglement circuit 1914), the classical control logic can select a subset of seed state generators that succeeded, and at block 2110, the classical control logic can control operation of a first switching network (e.g., switching network 1910) to couple inner modes from the selected subset of seed state generators to the inputs of the entanglement circuits. For instance, as described above, each entanglement circuit 1914 can include multiple instances of a fusion circuit, and each instance of the fusion circuit can receive an input mode from each of two different seed state generators. In some embodiments, the first switching network can be arranged such that selection of each input is managed through a separate switching network that operates on a different subset of seed state generators; however, other implementations are possible. In some embodiments, only the inner modes are operated on by the first switching network; photons in outer modes of all seed states can continue to propagate without passing through any active switches.

At block 2112, each instance of the entanglement circuit (e.g., entanglement circuit 1914) can operate on its inputs. As described above, the entanglement circuit can be nondeterministic, and fewer than all instances of the entanglement circuit may produce success. In some embodiments, the entanglement circuits can operate in stages, e.g., as described above. At block 2114, the classical control logic can receive classical heralding signals from the entanglement circuits and determine which of the entanglement circuits (or entanglement attempts) succeeded.

At block 2116, the classical control logic can select outer modes from the seed state generators for output. The selection can be based on which entanglement circuit succeeded and which seed state generators were selected to provide inputs to the entanglement circuit that succeeded. At block 2118, the classical control logic can control operation of a second switching network to couple the selected outer modes to output paths. In some embodiments, as described above, the second switching network can also select among multiple alternative output paths, and selection among output paths can be useful for some applications such as fusion-based quantum computing.

A variety of specific circuits to generate a particular entangled quantum system can be implemented using the reduced-switching circuit architecture shown in FIGS. 19 and 20 and the process of FIG. 21. For instance, any of circuits 1300, 1400, and 1800 can be understood as an example of the reduced-switching circuit architecture shown in FIGS. 19 and 20. The number of stages, circuit types at each stage, and number of circuit instances at each stage can be selected as desired. Optimal choices may depend on considerations such as the entanglement geometry of the quantum system to be produced and the success probability of the nondeterministic circuits. It should also be noted that multiple "parallel" instances of a circuit such as a seed state generator or fusion circuit can be implemented using temporal multiplexing techniques in which the same set of physical structures successively generates different instances of the circuit output, with delay lines being used to "store" earlier-generated instances until later-generated instances are created.

2.3. Quantum Computing Example

Figure 22:
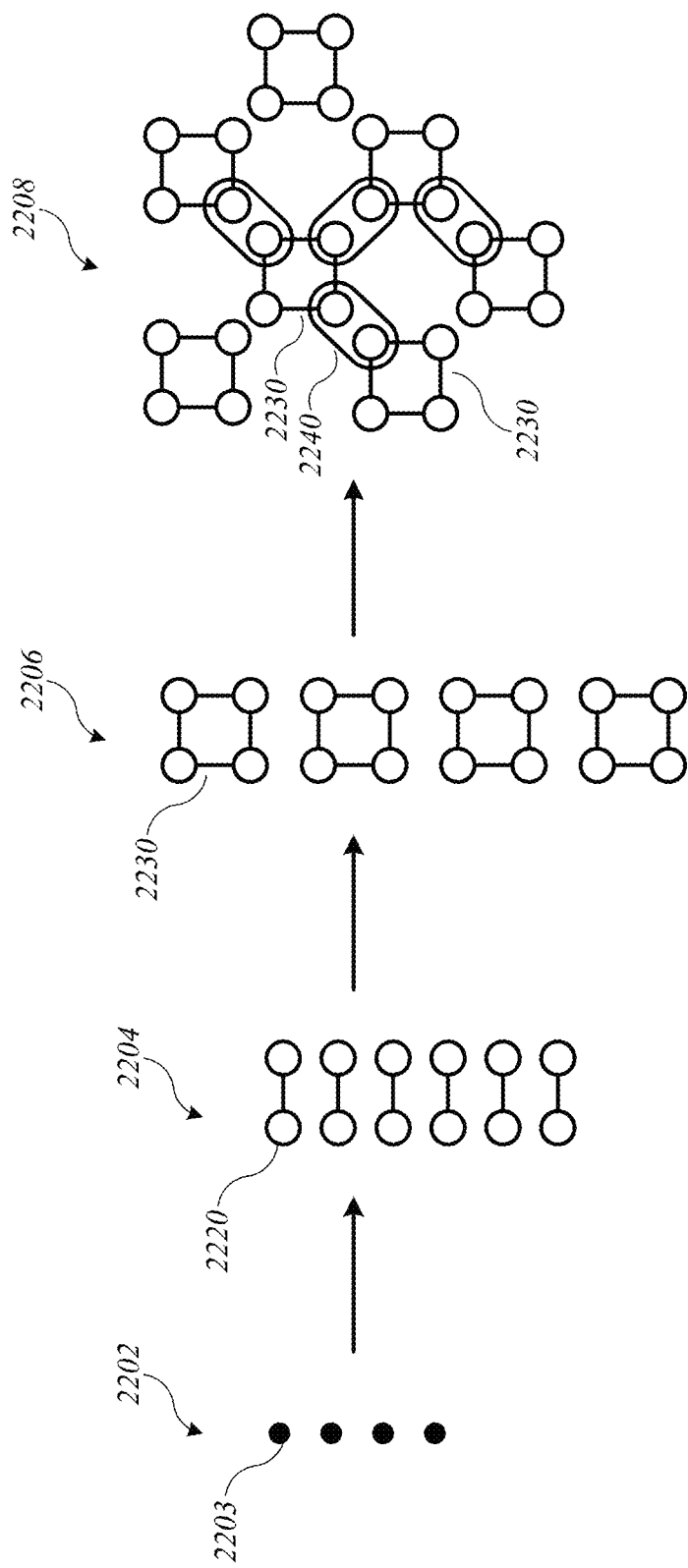
FIGS. 22-24 shows a simplified conceptual model of resource state generation and fusion-based quantum computing operations on resource states according to some embodiments.

According to some embodiments, reduced-switching architectures of the kind described above can be applied in the context of quantum computing. FIG. 22 shows a simplified conceptual model of an implementation of fusion-based quantum computing using optical circuits according to some embodiments. Initially (stage 2202), a set of single photons (represented by dots 2203) is generated. In this example it is assumed that photons are generated using a heralded single photon source (e.g., as described above) that produces a pair of photons, one of which is detected to determine whether the photon generation succeeded. Photon generation may be non-deterministic and an initial active multiplexing stage (e.g., a switch network) can be used to select a photon to propagate to subsequent stages. In some embodiments, active multiplexing at the photon-generation stage can be omitted.

At stage 2204, Bell pairs 2220 are generated from the single photons, e.g., using the Bell state generator circuit described above or other optical circuits capable of generating Bell pairs.

At stage 2206, Bell pairs 2220 are used to form resource states 2230. In this simplified example, each resource state 2230 is a "4-ring" state corresponding to state 1175 of FIG. 11B.

At stage 2208, fusion-based quantum computation operations can be performed on pairs of qubits from different resource states 2230. A particular computation can be dynamically selected by selecting a particular fusion operation 2240 to perform on each pair of qubits, for instance type II fusion with either X-basis or Z-basis measurement. (The operation can be selected separately for each pair of qubits.)

Figure 23:
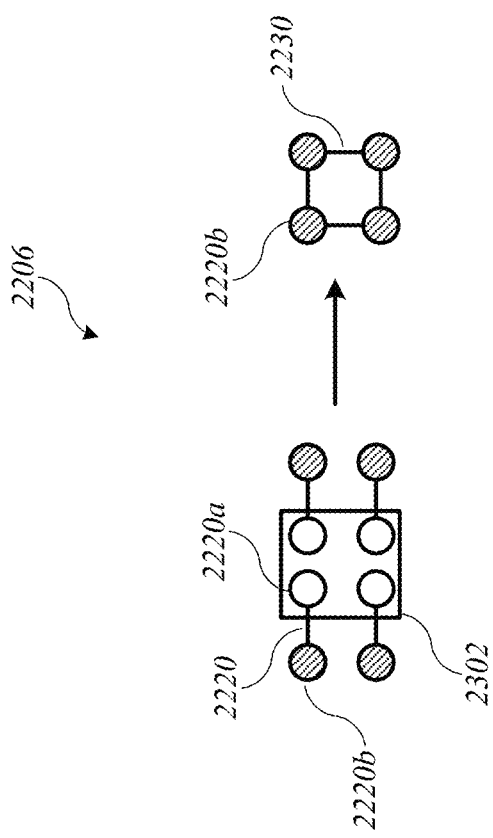
Figure 24:
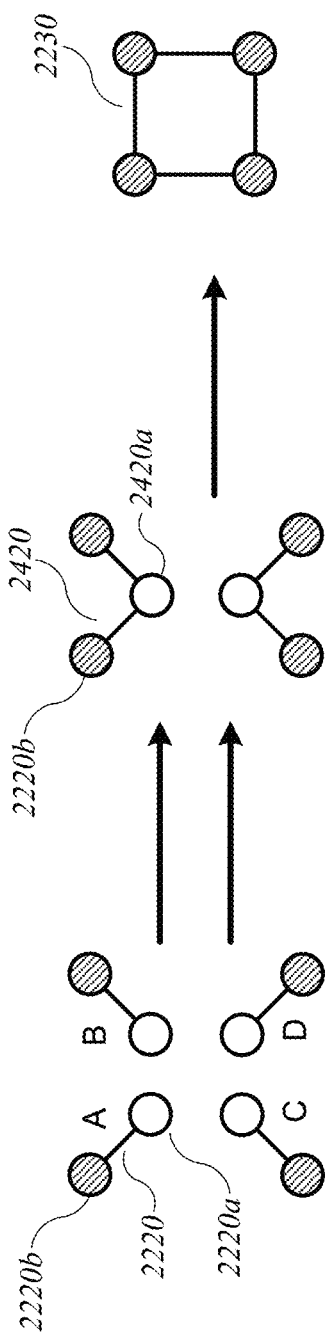

FIG. 23 shows a simplified conceptual model of operations at stage 2206, where a resource state 2230 is formed from Bell pairs 2220. Each Bell pair 2220 can be understood as including an inner qubit 2220a (white circle), which is consumed during resource state generation (indicated by box 2302), and an outer qubit 2220b (shaded circle), which is untouched during resource state generation and is only acted on during the final fusion operations 2240 as shown in FIG. 22. The outer qubits 2220b form resource state 2230; the inner qubits 2220a are consumed in the course of creating the desired entanglement among the outer qubits. FIG. 24 shows a more detailed conceptual model of one process for forming resource state 2230, similarly to FIG. 11B, highlighting how the inner qubits 2220a are consumed. As shown, type I fusion on pairs of Bell pairs 2220 can generate two 3-GHZ states 2420 without consuming outer qubits 2220b. Type II fusion on the inner qubits 2420a of the two 3-GHZ states 2420 can generate a 4-ring state 2230. It should be noted that the operations on the inner qubits can loss-tolerantly herald success, and this may add to the robustness of the process described herein.

Figure 25:
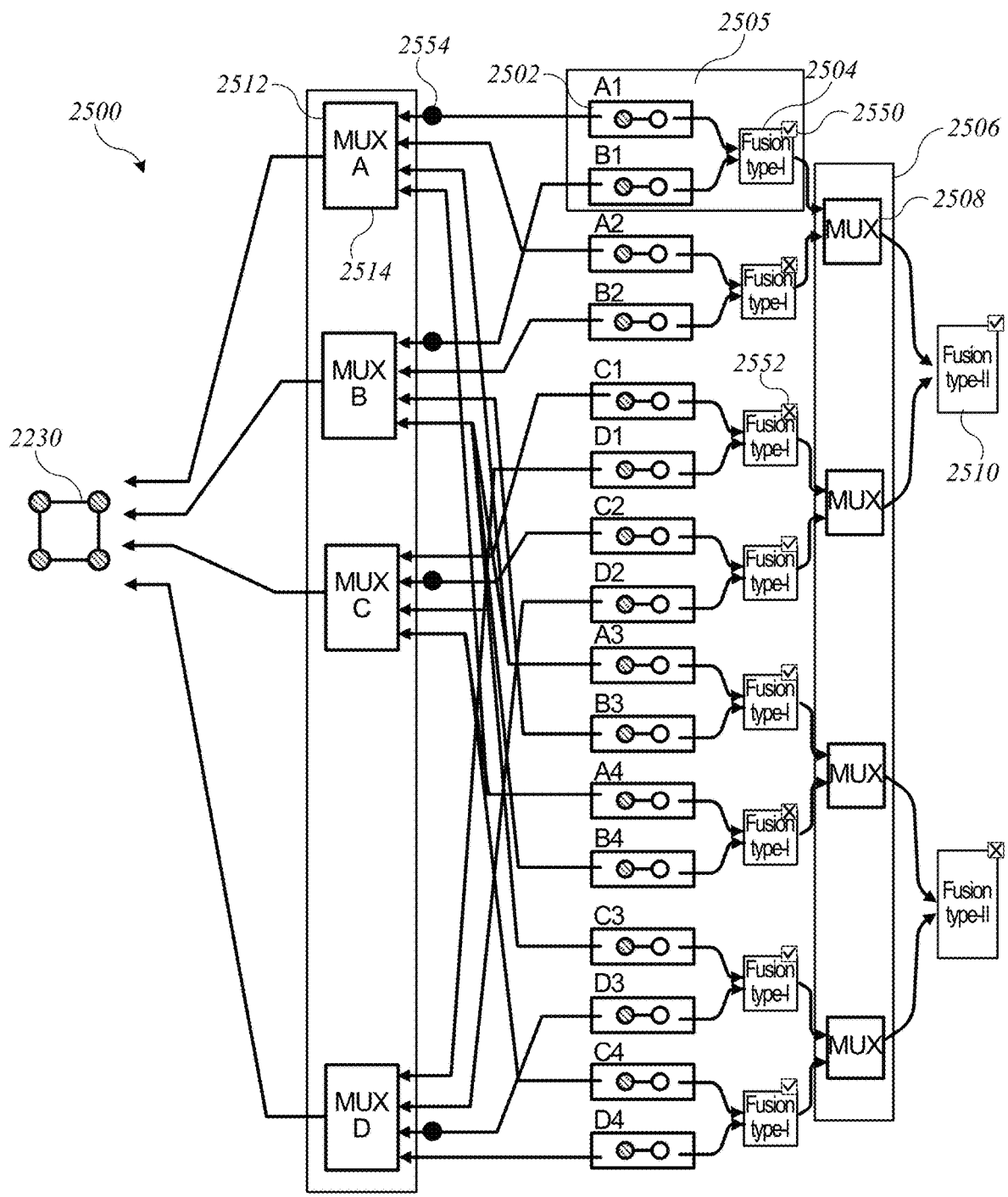
FIG. 25 shows a simplified schematic diagram of a circuit according to some embodiments.

A circuit having the architecture shown in FIGS. 19 and 20, such as the circuit of FIGS. 18A-18C, can be used to implement the conceptual model of FIGS. 22-24. FIG. 25 shows a simplified schematic diagram of a circuit 2500 according to some embodiments. Circuit 2500 includes Bell state generators 2502 coupled to type I fusion circuits 2504 (which together can correspond to a seed state generator 2505); a first switching network 2506 that includes multiplexers (MUX) 2508 operating on outputs from pairs of seed state generators 2505; entanglement circuits 2510 (in this case, type-II fusion circuits); and a second switching network 2512 comprising multiplexers 2514, each of which operates on a subset of outer modes from Bell state generators 2502. The classical control logic is not shown in FIG. 25; however, FIG. 25 is annotated to show an example of operation of the classical control logic. In particular, checkmarks 2550 indicate instances of fusion circuits 2504 and 2510 that succeeded in a given cycle of operation of circuit 2500, while X's 2552 indicate instances that failed. The checkmarks and X's can be understood as representing the state of heralding signals provided to the classical control logic by each circuit instance. The black dots 2554 on certain outer modes indicate the outer mode that is selected by each multiplexer 2514; the selection can be controlled by the classical control logic based on the heralding signals indicating which instances of fusion circuits 2504 and 2510 succeeded. The output of second switching network 2512 is a 4-ring resource state 2230. Implementation of circuit 2500 can be similar to the circuit shown in FIGS. 18A-18C. The view shown in FIG. 25 highlights how the (outer) qubits that form resource state 2230 are selected in a single switching step instead of passing through multiple switches.

Figure 26:
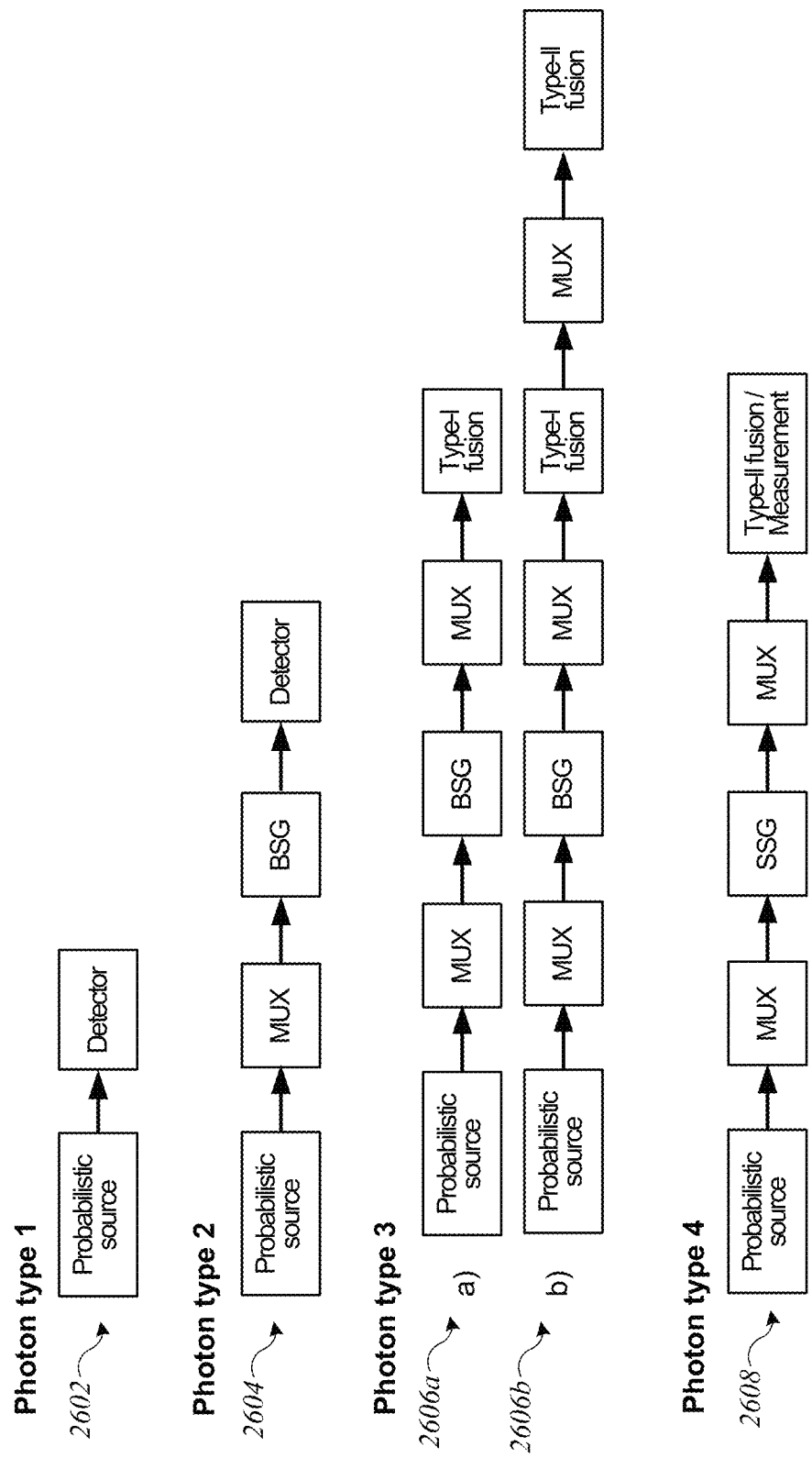
FIG. 26 summarizes the components encountered along the paths of each type of photon according to some embodiments.

In some embodiments, photons propagating in circuit 2500 or similar circuits can be categorized as one of four photon types: (1) photon generation heralds; (2) Bell pair (or seed state) generation heralds; (3) inner photons (used to herald creation of the resource state, or the outcome of stages along the way to creation of the final resource state); and (4) outer photons (which form the resource state). FIG. 26 summarizes the components encountered along the paths of each type of photon in circuit 2500. As shown at path 2602, photon generation heralds (photon type 1) are created in a probabilistic (or nondeterministic) photon source and detected. As shown at path 2604, Bell state generation heralds (photon type 2) are created in a probabilistic source, selected by an initial multiplexer (or other initial switch), input to a Bell state generator (BSG), then detected by a detector to determine success or failure of the BSG. As shown at paths 2606a and 2606b, inner photons (photon type 3) are created in a probabilistic source, selected by an initial mux, input to a BSG and eventually selected for type I or type II fusion. While path 2606b shows an inner photon encountering a multiplexer prior to type I fusion and again prior to type II fusion, this is not required. In some embodiments, e.g., as shown in FIG. 18A, individual modes that are not consumed in type I fusion need not be input to a multiplexer or active switch prior to the type I fusion operation. Outer photons (photon type 4) are created in a probabilistic source, selected by an initial multiplexer, input to a BSG, then not operated on again until the final switching network that selects modes for the final type II fusion and measurement operations implementing the quantum computation.

It will be appreciated that the foregoing quantum computing example is illustrative and that variations and modifications are possible. Other resource states can be defined, and a resource state can include any number of outer qubits with a variety of entanglement geometries. Any number of inner qubits can be consumed in the course of creating a resource state. Regardless of the number of qubits, the same principle can be applied that active switching for a particular mode occurs only at the point where that mode is to be consumed by an operation. Accordingly, the number of switches through which a given photon passes can be reduced.

In the example of FIG. 26, it is assumed that the photon generator is nondeterministic and that the initial input photons (e.g., for a Bell state generator) are selected by active switching of the outputs of several instances of a heralding photon generator. It should be understood that this is not required, and in embodiments where active switching is not used at the input, a photon (in particular an outer photon) may pass through just one active switch. For example, instead of applying active switches to outputs of a set of photon generators, active switching can be performed on just the heralding modes of a set of Bell state generators, so that photons of type 3 (inner) or type 4 (outer) in FIG. 26 need not pass through an initial multiplexer prior to seed state generation. Consequently, in some embodiments the number of active switches or multiplexers in the path of an outer photon can be reduced to just one.

Figure 27:
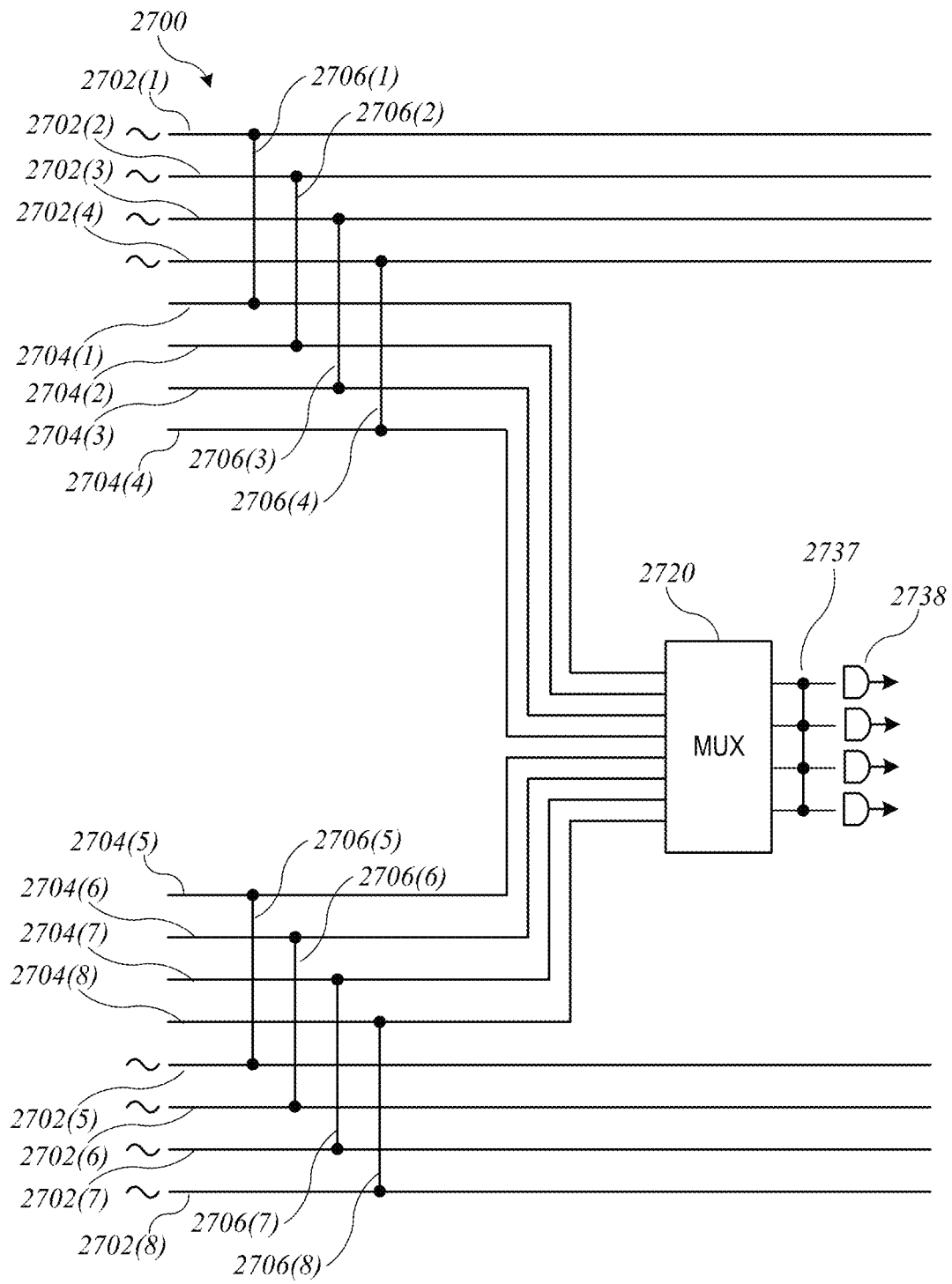
FIG. 27 shows an example of a Bell state generation circuit according to some embodiments.

To illustrate how active switching of photon-generator outputs can be omitted, FIG. 27 shows an example of a Bell state generation circuit 2700 according to some embodiments. In this example, Bell state generation circuit 2700 includes eight input modes 2702(1)-2702(8) that each receive an input photon and eight heralding modes 2704(1)-2704(8) that do not receive an input photon. Mode couplers 2706(1)-2706(8) each couple one of input modes 2702(1)-2702(8) to a corresponding one of heralding modes 2704 (1)-2704(8). Downstream of mode couplers 2706(1)-2706 (8), heralding modes 2704(1)-2704(8) are coupled to inputs of a multiplexer 2720. Multiplexer 2720 can be an active switching network that is controlled by classical control logic (e.g., as described above) in response to heralding signals from the photon sources that provide the input photons to Bell state generation circuit 2700. Based on the heralding signals from the photon sources, the classical control logic can identify, as "operative" modes, four input modes, from among the eight input modes 2702(1)-2702(8), that received photons as inputs. Multiplexer 2720 can selectably couple the heralding modes corresponding to the selected operative modes to the input modes of mode coupler 2737. For instance, if input modes 2702(1), 2702(4), 2702(6), and 2702(7) happen to be identified as the operative modes, then multiplexer 2720 would couple the corresponding heralding modes 2704(1), 2704(4), 2704(6) and 2704(7) to the input modes of mode coupler 2737. Mode coupler 2730 can operate similarly or identically to mode coupler 737 described above. The outputs of mode coupler 2730 are provided to detectors 2738, which can generate classical heralding signals as described above. In the event that detectors 2738 generate heralding signals indicating success, a Bell state is inferred to exist on the four input modes that were identified as the operative modes. Accordingly, the classical control logic can use this information to determine whether instances of downstream circuits coupled to one or more of modes 2702 can be identified as successful. For instance, downstream circuits coupled to any one or more of the modes 2702 that were not identified as operative should not be identified as successful, while downstream circuits coupled to modes 2702 that were identified as operative may be identified as successful. This configuration can avoid active multiplexing of photons at the input to the Bell state generator; the tradeoff is a larger number of modes.

In some embodiments, multiplexer 2720 can be a full 8×4 switching network that can couple any of its eight inputs to any one of its four outputs. This configuration can maximize the success probability of circuit 2700 so that the probability of success is effectively equal to the probability that at least four of input modes 2702 receive a photon. The tradeoff is the complexity of an 8×4 switching network. To reduce this complexity, multiplexer 2720 can be simplified. For example, multiplexer 2720 can be implemented using four 2×1 switching networks, with each switching network receiving two modes and selectably coupling one of its inputs to its output. For example, a first 2×1 switching network can receive modes 2704(1) and 2704(2), a second 2×1 switching network can receive modes 2704(3) and 2704(4), and so on. If each input mode 2702(1)-2702(8) has a probability p of receiving a photon, then the probability of obtaining a Bell state is increased to $1-(1-p)^2$. Other implementations of multiplexer 2720, such as a pair of 4×2 switching networks, can also be used.

It will be appreciated that circuit 2700 is illustrative and that variations and modifications are possible. For example, the number N of input modes 2702 (and heralding modes 2704) can be selected as desired. In some embodiments, the number N can be selected such that the probability that at least four of input modes 2702 receive a photon approaches one. Multiplexer 2720 can be a full N×4 switching network, or a set of smaller switching networks (e.g., n×1 switching networks, where n=N/4. In the latter case, the probability of obtaining a Bell state is increased to $1-(1-p)^n$. Other modifications are also possible.

3. Additional Embodiments

Described above are examples of circuits and techniques that can be used to generate and operate on entangled systems of qubits. Those skilled in the art with access to the present disclosure will recognize that other implementations and embodiments can also be constructed. The number of modes and the particular arrangement and physical construction of circuit components described herein can be modified as desired. Circuits of the kind described herein can be used in conjunction with any type of single photon sources and/or detectors. Classical control logic can be implemented on-chip with the waveguides, beam splitters, and other circuit components or off-chip as desired. Further, the techniques described herein can be adapted to qubits implemented using other types of physical systems, not limited to photons.

It should be understood that all numerical values used herein are for purposes of illustration and may be varied. In some instances ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added. In some instances, one circuit component may be described as being "downstream" or "upstream" of another circuit component. Such references should be understood as meaning that the components are arranged such that the "downstream" circuit component does not operate on a particular mode until after the "upstream" circuit component has completed any operations involving that mode; components may be arranged and reordered as desired provided that the upstream/downstream order of operations on a particular mode is preserved.

This disclosure provides a description of the claimed invention with reference to specific embodiments. Those skilled in the art with access to this disclosure will appreciate that the embodiments are not exhaustive of the scope of the claimed invention, which extends to all variations, modifications, and equivalents.

What is claimed is:

1. An optical circuit comprising:
   a plurality of seed state generators, each seed state generator configured to generate a seed state comprising a quantum system of a plurality of entangled photonic qubits propagating on a plurality of modes that includes a set of inner modes corresponding to a first subset of the qubits and a set of outer modes corresponding to a second subset of the qubits;
   a plurality of entanglement circuits, wherein each entanglement circuit is configured to receive a plurality of input modes and to perform an entanglement-generating operation on the input modes, wherein the entanglement-generating operation includes a fusion operation that consumes at least one of the input modes and creates an entangled state among other modes with which each consumed input mode was entangled;
   a first switching network coupled to the inner modes of the plurality of seed state generators and configured to selectably couple the inner modes of different ones of the seed state generators to the input modes of different ones of the entanglement circuits;
   a second switching network including a plurality of multiplexers and a plurality of output paths, each multiplexer coupled to the outer modes of at least two of the seed state generators and configured to selectably couple the outer modes of one of the at least two of the seed state generators to one of the output paths, wherein different multiplexers couple to different output paths; and
   classical control logic coupled to the seed state generators, the entanglement circuits, the first switching network, and the second switching network, the classical control logic being configured to:
      receive heralding signals from the seed state generators and the entanglement circuits, the heralding signals indicative of success or failure of the seed state generators and the entanglement circuits;
      determine, based on the heralding signals from the seed state generators, which inner modes should be selected by the first switching network; and
      determine, based on the heralding signals from the entanglement circuits and the seed state generators, which outer mode should be selected by each of the second switching networks.

2. The optical circuit of claim 1 wherein each of the seed state generators comprises a Bell state generator.

3. The optical circuit of claim 1 wherein each of the seed state generators comprises a 3-GHZ state generator.

4. The optical circuit of claim 3 wherein each 3-GHZ state generator comprises two Bell state generators and a type-I fusion circuit coupled to one output mode of each of the Bell state generators.

5. The optical circuit of claim 1 wherein each entanglement circuit comprises a type II fusion circuit.

6. The optical circuit of claim 1 wherein each entanglement circuit comprises a type I fusion circuit.

7. The optical circuit of claim 1 wherein each multiplexer in the second switching network is further configured to selectably couple each selected outer mode to a selected one of a plurality of alternative output paths and wherein the classical control logic is further configured to determine which alternative output path should be selected by each multiplexer.

8. The optical circuit of claim 1 wherein the entanglement circuit comprises a plurality of successive entanglement operation stages and each entanglement operation stage is coupled to a next successive entanglement operation stage by an additional switching network.

9. The optical circuit of claim 1 further comprising a plurality of photon sources coupled to each of the seed state generators and configured to provide input photons to the seed state generators.

10. The optical circuit of claim 1 wherein the first switching network comprises a plurality of multiplexing circuits, each multiplexing circuit coupled to the inner modes of a different subset of the seed state generators and to the input modes of a different one of the entanglement circuits.

11. A method comprising:
   operating a plurality of seed state generators to produce a plurality of seed states, each seed state including a quantum system of a plurality of entangled photonic qubits propagating on a plurality of modes that includes a set of inner modes corresponding to a first subset of the qubits and a set of outer modes corresponding to a second subset of the qubits;
   receiving, by a classical control logic unit, heralding signals from the plurality of seed state generators;
   determining, by the classical control logic unit, based on the heralding signals from the seed state generators, which of the seed state generators succeeded;

operating a first switching network, wherein the first switching network selectably couples the inner modes of different ones of the seed state generators to input modes of different ones of a plurality of entanglement circuits and wherein operation of the first switching network is responsive to determining which of the seed state generators succeeded;

operating the plurality of entanglement circuits, wherein each entanglement circuit performs an entanglement-generating operation on the input modes, wherein the entanglement-generating operation includes a fusion operation that consumes at least one of the input modes and creates an entangled state among other modes with which each consumed input mode was entangled;

receiving, by the classical control logic unit, heralding signals from the plurality of entanglement circuits;

determining, by the classical control logic unit, based on the heralding signals from the plurality of entanglement circuits, which of the entanglement circuits succeeded; and operating a second switching network including a plurality of active multiplexers, wherein each active multiplexer selectably couples one of the outer modes of one of the seed state generators to an output path and wherein operation of the plurality of second switching networks is responsive to determining which of the entanglement circuits succeeded and determining which of the seed state generators succeeded.

12. The method of claim 11 wherein each of the seed states is a Bell state.

13. The method of claim 11 wherein each of the seed states is a 3-GHZ state.

14. The method of claim 11 wherein the entanglement operation includes a type I fusion operation.

15. The method of claim 11 wherein the entanglement operation includes a type II fusion operation.

16. The method of claim 11 wherein each entanglement circuit performs a sequence of entanglement-generating operations on different ones of the input modes, the method further comprising:

selecting, by the classical control logic unit, particular input modes to be used in a next entanglement-generating operation in the sequence, wherein the selection is based at least in part on determining which instances of an earlier entanglement-generating operation in the sequence.

17. The method of claim 11 wherein each active multiplexer has a plurality of alternative output paths and wherein the method further comprises:

selecting, by the classical control logic unit, one of the plurality of alternative output paths for each active multiplexer.

18. The method of claim 17 wherein selecting one of the plurality of alternative output paths for each active multiplexer is based at least in part on a quantum computation to be performed.

19. The method of claim 11 further comprising:

generating a plurality of photons using a plurality of instances of a photon source; and providing a subset of the plurality of photons to each of the seed state generators.

* * * * *